United States Patent
Paradie

(10) Patent No.: US 10,690,748 B2
(45) Date of Patent: Jun. 23, 2020

(54) SYSTEM AND METHOD FOR INTERFERENCE DETECTION IN A RF RECEIVER

(71) Applicant: Veoneer US, Inc., Southfield, MI (US)

(72) Inventor: Michael Paradie, Hollis, NH (US)

(73) Assignee: Veoneer US, Inc., Southfield, MI (US)

(*) Notice: Subject to any disclaimer, the term of this patent is extended or adjusted under 35 U.S.C. 154(b) by 319 days.

(21) Appl. No.: 15/670,448

(22) Filed: Aug. 7, 2017

(65) Prior Publication Data
US 2019/0041492 A1 Feb. 7, 2019

(51) Int. Cl.
*G01S 7/02* (2006.01)
*G01S 7/35* (2006.01)
*G01S 13/931* (2020.01)

(52) U.S. Cl.
CPC .............. *G01S 7/023* (2013.01); *G01S 7/352* (2013.01); *G01S 7/354* (2013.01); *G01S 13/931* (2013.01); *G01S 2007/356* (2013.01)

(58) Field of Classification Search
CPC .......... G01S 7/023; G01S 7/352; G01S 7/354; G01S 13/931; G01S 2007/356
USPC ..................................................... 342/70–72
See application file for complete search history.

(56) References Cited

U.S. PATENT DOCUMENTS

| 6,690,746 B1 * | 2/2004 | Sills | G06K 9/00523 375/316 |
|---|---|---|---|
| 8,471,760 B2 | 6/2013 | Szajnowski | |
| 9,182,476 B2 | 11/2015 | Wintermantel | |
| 2002/0094044 A1 * | 7/2002 | Kolze | H04B 1/1027 375/346 |
| 2003/0030583 A1 * | 2/2003 | Finn | B60R 21/013 342/70 |
| 2004/0258178 A1 * | 12/2004 | Leblond | G01S 19/21 375/316 |
| 2005/0088335 A1 * | 4/2005 | Stephens | G01S 7/026 342/146 |
| 2006/0152405 A1 | 7/2006 | Egri et al. | |

(Continued)

FOREIGN PATENT DOCUMENTS

| EP | 2390679 A1 * | 11/2011 | ............ G01S 7/023 |
|---|---|---|---|
| EP | 2390679 A1 | 11/2011 | |

OTHER PUBLICATIONS

"Radar CFAR Thresholding in Clutter and Multiple Target Situations;" Hermann Rohling; IEEE Transactions on Aerospace and Electronic Systems; vol. AES-19, No. 4; Jul. 1983.

(Continued)

Primary Examiner — Marcus E Windrich
(74) Attorney, Agent, or Firm — Burns & Levinson LLP

(57) ABSTRACT

An interference detection methods and receivers for receiving an RF signal including a desired RF signal and an intermittent interference signal, estimating thermal noise of the receiver by statistically analyzing a plurality of time intervals of data of the received RF signal, including at least one data interval not including the interferer, estimating an intermittent-interference-plus-noise level by statistically analyzing an extended time interval of the data, determining an interference metric based on a ratio of the estimates, and evaluating the interference metric against one or more thresholds to detect the presence or absence of degrading RF interference. The statistical analysis may include application of order statistic filtering.

23 Claims, 19 Drawing Sheets

(56) References Cited

U.S. PATENT DOCUMENTS

2008/0182543 A1\* 7/2008 Yang .................... H04B 1/1027
455/296
2015/0070204 A1 3/2015 Shirakawa
2015/0145718 A1\* 5/2015 Choi ....................... G01S 7/285
342/26 R

OTHER PUBLICATIONS

Invitation to Pay Additional Fees, Communication Relating to the Results of the Partial International Search, and Provisional Opinion Accompanying the Partial Search Result in corresponding International Application No. PCT/US2018/044986, dated Nov. 6, 2018; 30 pages.
"Order Statistic", Internet Citation, May 4, 2017, Retrieved from the Internet: URL:https://en.wikipedia.org/w/index.php?title=Order_statistic&oldid=778658493.
"Rayleigh Distribution", Jun. 19, 2017, Retrieved from the Internet: URL:https://en.wikipedia.org/w/index.php?title=Rayleigh_distribution&oldid=786515437.

\* cited by examiner

US 10,690,748 B2

SYSTEM AND METHOD FOR INTERFERENCE DETECTION IN A RF RECEIVER

TECHNICAL FIELD

The present disclosure relates generally to the detection of the presence of radio frequency (RF) interference, and more specifically, to the detection of RF interference being experienced by a radar receiver.

BACKGROUND

As uses of RF transceiving technologies proliferate, so does the likelihood of potentially performance degrading interference being received by a RF transceiver, such as an automotive radar system. Possible effects include reduced ability of the RF receiver to detect objects of interest and/or to estimate relevant parameter values of those detected objects, such as object range, object bearing, and/or object Doppler. The reliable detection of degrading interference becomes especially important for safety-critical applications. For example, a radar mounted in the front bumper of a vehicle may be relied upon to detect objects in the path of the host vehicle. If the radar cannot perform its function within specifications due to the presence of interference, then it must notify the controlling system of this situation so that it can recover to a safe state.

Interference may be categorized in several ways, such as continuous versus intermittent, narrowband versus wideband, etc. Narrowband interferers may include AM radio broadcasts and amateur radio signals. Wideband noise that extends across a large portion of the RF spectrum may also interfere. Wideband noise can be caused, for example, by electrical machinery, internal combustion engines (e.g., lawn mowers), fluorescent lights, and other sensors. Wideband interferers can be somewhat random, and may be more difficult to avoid. The bandwidth of a RF receiver can be approximated by the inverse of its receiver gate. For example, the bandwidth of a radar receiver having receiver gate of 400 ns is 2.5 MHz. An example of a wideband interference source is the RF transmission of a narrow pulse, such as having a duration of 10 ns, which would have a bandwidth of 100 MHz. Another example of a wideband interference source is a fast frequency chirp, such as continuous wave (CW) transmission that changes frequency in steps or continuously over a span of 200 MHz over a duration of 10 μsec.

All RF receivers experience electrical fluctuations produced by internal components, which is known as thermal noise. The thermal noise and a desired signal of interest (SOI), such as a reflection from a target object of a RF signal transmitted by the sensor, undergo subsequent amplification. The thermal noise may change with temperature, component aging and/or be inherently distinct for different radar systems.

A significant challenge is to distinguish between the presence of degrading interference and ordinary changes in thermal noise contributions. The latter may be caused by changes in receiver-chain amplification, which affects the signal and noise equally, thereby not presenting a significant change in receiver functionality. The former, however, causes a significant increase in receiver noise levels without the corresponding improvement in signal quality, therefore degrading the ability of the receiver to perform its intended function.

Current technologies might attempt to solve this interference differentiation problem by estimating the thermal noise level of the receiver. The presence of interference would be declared when the receiver noise level exceeds some threshold above the estimated thermal noise level. For example, interference might be declared when the receiver noise consistently exceeds 10 dB above the estimated thermal noise level. This technique, however, does not always provide good results, due to the challenge of accurately estimating the thermal noise level of the receiver. In practical receivers, there can be significant variability in receiver-chain gain due to changes in temperature, component aging and/or between different instances of manufactured radars. It is often beyond state-of-the-art and/or available resources to adequately characterize and model the gain in order to adequately predict thermal noise levels.

The direct measurement of thermal noise level by the receiver is another possible technique. The implementation of this technique, however, may require the presence of additional and costly receiver circuitry. It may also require the interruption of normal radar functionality in order to perform this measurement, which might be undesirable.

Poor estimation of thermal noise levels can cause excessive false detections of interference. This might be remedied by raising the detection threshold, for example, from 10 dB to 25 dB. A higher threshold, however, degrades the ability to detect the presence of lower, yet still significantly degrading, levels of interference in the radar receiver. To achieve very low false-detection rates, the threshold might even need to be increased to such a high level that degrading interference can usually not be discriminated.

Therefore, there is a need for a RF interference detector and method with improved identification of system performance degrading interference.

SUMMARY

The present disclosure describes embodiments of improved apparatus (e.g., a detector, receiver, etc.) and methods to detect narrowband and/or wideband interference present with a SOI in RF signal received by a RF receiver. The embodiments utilize automated real-time signal analysis characterizing changing densities and distributions of signal features with order statistical filtering.

Accurate detection of interference is important to ensure proper operation of the RF receiver. For example, it can permit the generation of notification signals such as alerts or control signals for deployment of counter measures to mitigate the harmful effects of the interference. One example of a counter measure would be to adjust the RF transceiver's transmission frequency plan in order to avoid or to reduce the interference. Another example is to activate a special operating mode that might degrade performance during normal operation, but provide a net improvement in functionality during the presence of degrading interference.

In one embodiment, the detected objects from an automotive radar may be used to implement an application. For the example of an automotive radar installed in the corner of the rear bumper, an application might be blindspot detection. Such applications provide an audio, visual, and/or haptic warning to alert the driver to the presence of another vehicle in the blindspot region of the driver's vehicle. Depending on details of the radar design and the interference, the presence of interference could cause false alerts to the driver and/or missed alerts for actual vehicles in the blindspot region. In such cases, interference detection can alternatively be used to determine when to disable the blindspot application and to inform the driver that the application is unavailable. Alternatively, interference detection could also be used to improve performance by, for example, activating alternative algorithms to improve application performance in the presence of interference. In certain embodiments, an interference alert is issued, or an interference suppression or avoidance application invoked, if an interference metric determined by the methods or apparatus described herein exceeds an alert threshold for a predetermined number of sampling cycles. The alert or invoked application may then be ceased if the interference metric falls below the alert threshold (e.g., immediately, or after a predetermined time, number of cycles, etc.).

Any of the aspects and/or embodiments described herein can include one or more of the following embodiments. In one embodiment, a method is provided wherein an RF signal is detected at a receiver. The received RF signal may include an RF SOI and potentially an intermittent interference signal occupying an interference bandwidth. Thermal noise of the receiver may be estimated by statistically analyzing a plurality of time intervals of spectral magnitude data of the received RF signal, including at least one spectral magnitude data interval not including the intermittent interference signal. Order statistics may be applied to the spectral magnitude data to estimate the thermal noise, and to estimate an intermittent-interference-plus-noise level by statistically analyzing an extended time interval of the spectral magnitude data so that the degrading interference, if present, is included in the analyzed spectral magnitude data. An interference metric may then be determined based on a ratio of the estimated intermittent-interference-plus-noise level to the estimated thermal noise. The interference metric may then be evaluated against one or more thresholds to detect the presence or absence of degrading RF interference.

In one embodiment, estimating the thermal noise comprises obtaining a frequency domain representation of the plurality of time intervals, wherein the frequency domain representation includes a magnitude level for each of a plurality of frequencies sorted in an order statistic (e.g., Rayleigh or other) distribution. A value may be determined associated with a thermal-noise reference percentile relative to the distribution as a raw thermal noise estimate, and the raw thermal noise estimate may be conditioned to compensate for estimation bias in order to obtain the thermal noise estimate. Estimating the intermittent-interference-plus-noise level may include obtaining a frequency domain representation of the extended time interval, wherein the frequency domain representation includes a magnitude level for each of a plurality of frequencies sorted in an order statistic Rayleigh distribution. Then a value may be determined associated with the reference percentile relative to the Rayleigh distribution as a raw intermittent-interference-plus-noise level estimate, and the raw intermittent-interference-plus-noise level estimate may be conditioned to compensate for estimation bias to obtain the intermittent-interference-plus-noise level estimate.

A selected number of samples of the extended time interval may be discarded prior to obtaining the frequency domain representations. The thermal-noise reference percentile may comprise a standard deviation percentile along the Rayleigh distribution selected to be lower than representations of RF object reflections and degrading interference in the Rayleigh distribution.

In one aspect, estimate conditioning may comprise eliminating outlier and averaging remaining thermal noise or intermittent-interference-plus-noise level estimates, respectively, over several sampling cycles. Obtaining the frequency domain representations may further comprise respectively reducing sidelobe energies of the frequency domain representations through application of a window approximation (e.g., a Kaiser window, etc.).

In another embodiment, normalization techniques may be applied in order to compensate for time domain attenuation underestimations of the thermal noise and intermittent-interference-plus-noise level estimates resulting from the window approximation.

In another aspect, obtaining the frequency domain representations may comprise applying a FFT of respective lengths. Whereas an FFT length associated with the thermal noise estimation may comprise a fraction of the number of time intervals in the plurality of time intervals, the FFT length associated with the intermittent-interference-plus-noise level estimation may be equal to a number of time domain samples of the extended time interval. The use of distinct FFT lengths may result in scaling changes in the thermal noise and intermittent-interference-plus-noise level estimates. Normalization may be utilized to compensate for such operations.

One or more parameters may be received by the RF receiver (or a detector or controller of the receiver) specifying at least one of the number of time intervals in the plurality, a number of time intervals to be discarded prior to estimating the thermal noise, an FFT length to be used in estimating the thermal noise, an FFT length to be used in estimating the interference plus noise level, and a percentile for identifying a reference percentile relative to an order statistic Rayleigh distribution of the spectral magnitude data.

In another aspect, present disclosure provides an interference detector for use with an RF receiver configured to receive an RF signal including a SOI and potentially an intermittent interference signal occupying an interference bandwidth. The detector may include a controller and/or processor configured to operate in accordance with any of the above method embodiments. In one embodiment, the RF receiver comprises an automotive radar receiver.

In another embodiment, the disclosure provides an RF receiver configured to detect RF interference that includes a front end configured to receive an RF signal including a SOI and potentially an intermittent interference signal occupying an interference bandwidth, and an interference detection controller and/or processor configured to operate in accordance with any of the above method embodiments.

The foregoing and other features and advantages of the embodiments will be apparent from the following more particular description, as illustrated in the accompanying drawing.

BRIEF DESCRIPTION OF THE FIGURES

The present disclosure is further described in the detailed description which follows, in reference to the noted plurality of drawings by way of non-limiting examples of embodiments of the present disclosure, in which like reference numerals represent similar parts throughout the several views of the drawings.

DETAILED DESCRIPTION

The details described and illustrated herein are by way of example and for purposes of illustrative description of the exemplary embodiments only and are presented in the case of providing what is believed to be the most useful and readily understood description of the principles and conceptual aspects of the disclosure. In this regard, no attempt is made to show structural details of the subject matter in more detail than is necessary for the fundamental understanding of the disclosure, the description taken with the drawings making apparent to those skilled in that how the several forms of the present disclosure may be embodied in practice. Further, like reference numbers and designations in the various drawings indicate like elements.

Figure 1:
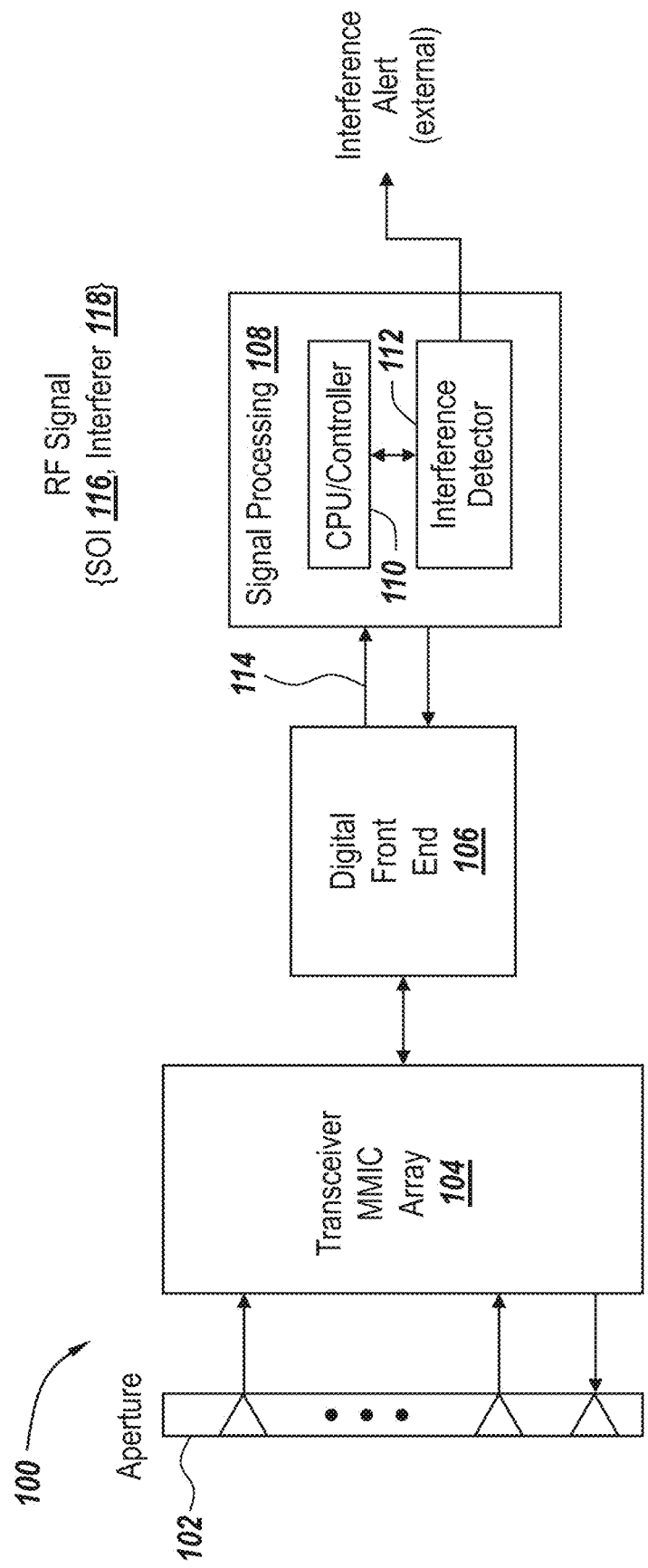
FIG. 1 is a schematic functional block diagram illustrating a RF sensor system in accordance with various embodiments.

The embodiments described herein are directed to interference detection methods and detectors, and RF receivers employing them. FIG. 1 illustrates an exemplary radar sensor (radar system) 100, the sensor having two receiver channels and one transmitter channel. Radar sensor 100 may be configured with conventional RF components and assemblies, such as an antenna array 102, analog front end electronics 104, a digital front end module 106, and a signal processing module 108. Signal processing module 108 may be configured with a processor or controller 110 and an interference detector 112 that operates on a received RF signal 114 in accordance with the disclosed embodiments.

Figure 2:
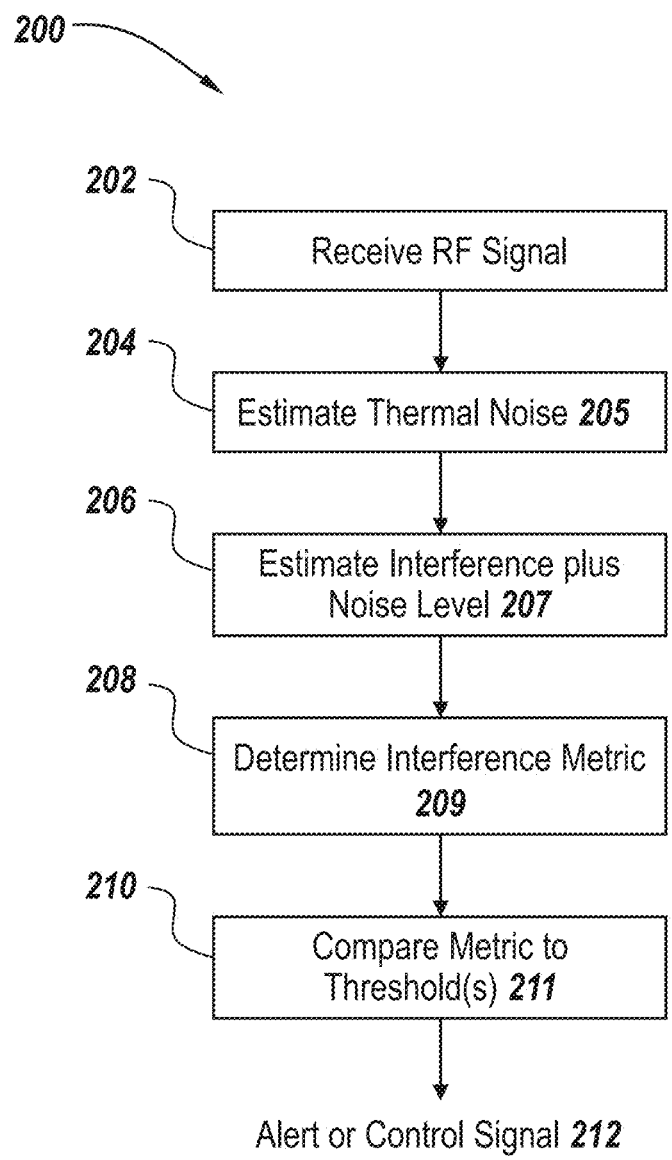
FIG. 2 is a flow diagram illustrating a method of interference detection in accordance with an embodiment of the disclosure.

FIG. 2 illustrates multiple steps of an interference detection method 200 in accordance with an embodiment. Once the distribution of the thermal noise and interference is known, the statistical model can be used to set thresholds for satisfying interference alert and/or countermeasure initiation or cessation. Method 200 will be described in detail with example functional block diagrams shown in additional figures. In general, however, exemplary method 200 begins by receiving (step 202) the received RF signal 114 detected by radar sensor 100. Received signal 114 includes an RF signal of interest (SOI) 116, such as a reflected wave of a transmitted signal emitted by a transmitter of radar sensor 100, and potentially an intermittent interference signal 118 occupying an interference bandwidth. In step 204, thermal noise 205 is estimated by the interference detector 112 by statistically analyzing a plurality of short time intervals of spectral magnitude data of the received RF signal 114, including at least one spectral magnitude data interval not including the intermittent interference signal 118. The interference source cannot be continuously present during operation of the sensor 100. In an exemplary embodiment, "present" may mean detectable for at least a determined time, such as 6 ms. So, not continuously present would mean that there must be some time gaps in the presence and/or effects of the interfering source. For example, an interfering source might have a repeating transmission cycle, where each cycle has example duration of 30 ms. A first segment of the interferer cycle might comprise 20 ms of fast frequency sweeping that causes interference to the sensor 100. A second segment, however, might comprise a pulsed segment at a single carrier frequency lasting 6 ms, which does not cause degrading interference to sensor 100. Finally, a last example segment might consist of a 4 ms period of no RF transmissions.

An interference-plus-noise level 207 may be estimated (step 206) by detector 112 by statistically analyzing an extended time interval of the data of received RF signal 114, so that the degrading interference, if present, will be included in the extended time interval. In step 208, an interference metric 209 may be determined by detector 112 based on a ratio of the estimated interference-plus-noise level 207 to the estimated thermal noise 205. In step 210, the interference metric 209 may be evaluated against one or more thresholds 211 to detect the presence or absence of degrading RF interference in received RF signal 114. If the interference metric 209 exceeds the one or more thresholds 211 under conditions defined by logic of the detector 112, an alert or other countermeasure control signal 212 may be issued by the detector 112.

Figure 3:
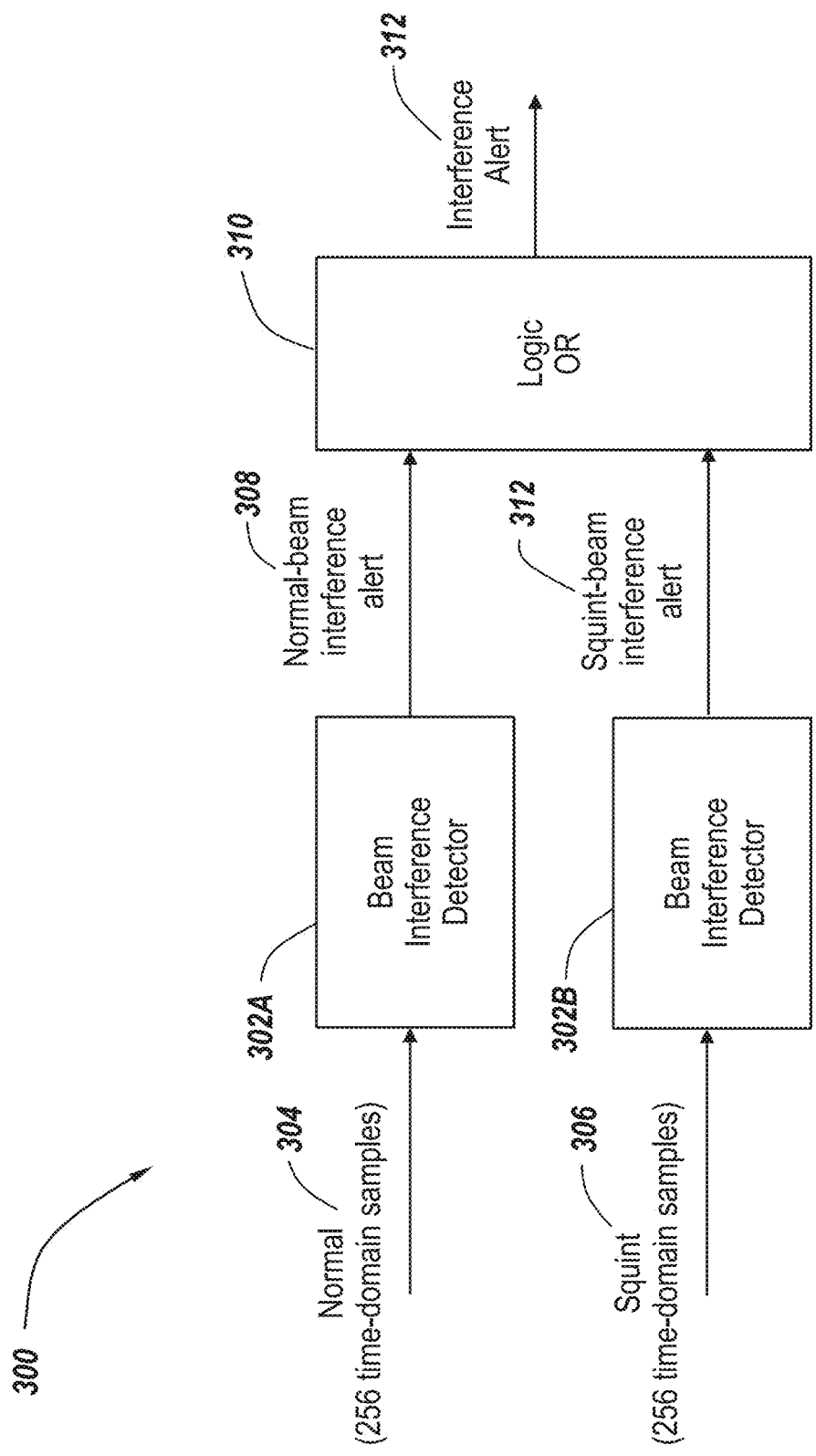
FIG. 3 is a schematic functional block diagram illustrating an embodiment of an interference detector.

FIG. 3 is a block diagram representation of an embodiment of an interference detector 300 (which may be very similar or identical to detector 112). As shown, interference detector 300 may be configured with two data flow channels, one of which may receive a first input data stream 304, for example a stream of 256 time-domain samples of the received RF signal 114 received at a normal angle to an antenna array of the sensor 100. A second time-domain data stream 306 corresponding to the received RF signal 114 received at a squint angle with respect to the sensor 100 antenna array may be received as input to the second data flow channel. The time-domain data streams 304, 306 (which in other embodiments are not limited to normal and squint angle data streams) are each fed into respective beam interference detectors 302A, 302B, which in turn generate, respectively, normal-beam interference alert 308 and squint-beam interference alert 312 signals. Alerts signals 308, 312 may be received by logic module 310, which uses indication(s) of the presence of a degrading interference signal reflected in the values of the alert signals 308, 312 to determine whether to issue an interference alert 312 (or other counter measure control signal).

Figure 4:
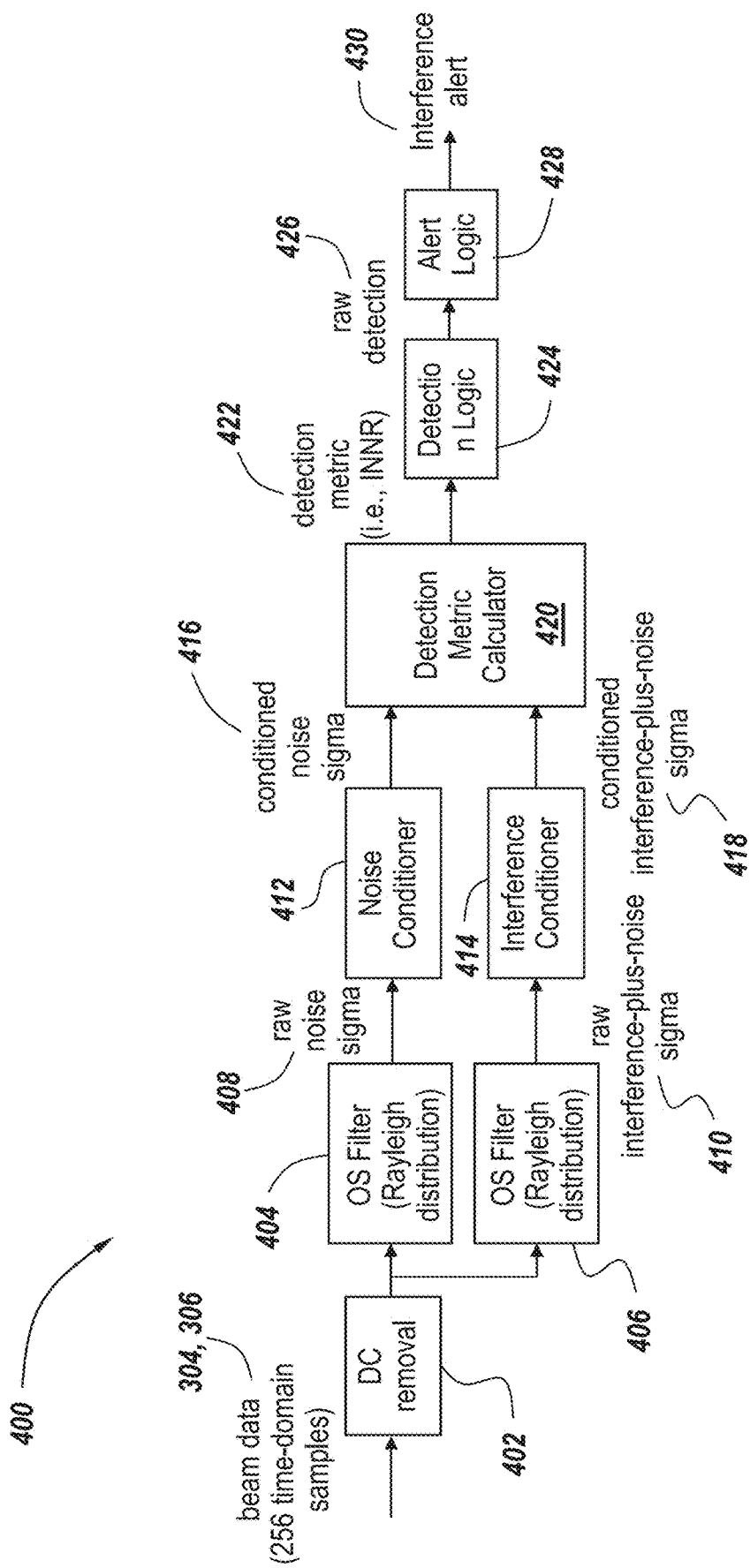
FIG. 4 is a schematic functional block diagram illustrating another perspective of an embodiment of an interference detector.

FIG. 4 is a block diagram showing in more detail functional components of an embodiment of an interference detector 400, i.e., implementing 302A and/or 302B. The time-domain data samples 304, 306 are received at DC removal module 402 where average values of any DC signals present in the samples are removed. The output from DC removal module 402 is split into separate noise and interference-plus-noise signal processing data flows. As will be described in detail below, the signal processing channels employ order statistics (OS) in OS filters 404, 406 to respectively generate raw noise estimate $\sigma_n$ 408 and raw interference plus noise estimate $\sigma_{ri+n}$ 410, and conditioning (at conditioners 412, 414) to generate conditioned noise estimate $\sigma_{cn}$ 416 and conditioned interference plus noise estimates $\sigma_{ci+n}$ 418 that are used by detection metric calculator 420 to determine an interference-plus-noise to noise ratio 422. OS are advantageous because they are directly related to the underlying distribution and are robust in the presence of outliers. Detection logic 424 then uses the detection metric 422 to determine whether a degrading interfering signal has been detected; i.e., a raw detection signal 426 is output from detection logic 424. Additional alert logic 428 then determines whether alert conditions have been met, and if so, an interference alert 430 (or countermeasure control signal) is output.

Figure 5A:
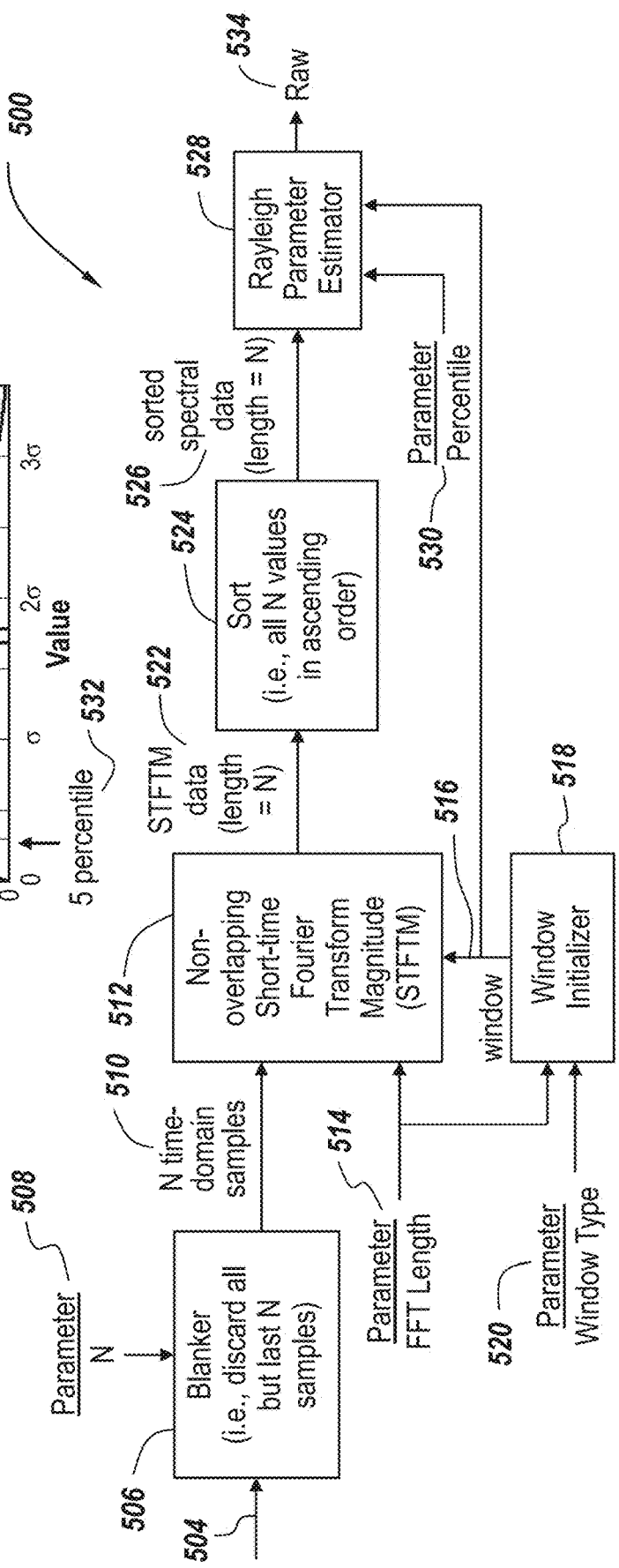
FIGS. 5A-5C are schematic functional block diagrams illustrating components of an embodiment of an order statistic filter.

FIG. 5A illustrates in more detail the operation of an OS filter 500, such as OS filter 404 which is used to estimate thermal noise 205 and OS filter 406 used to estimate interference plus noise in received RF signal 114. OS filter 500 utilizes Rayleigh probability distribution 502 and a number of process control parameters whose values depend upon whether thermal noise 205 or interference plus noise level 207 is being estimated. The significance of the example parameter values shown in Table One will be described below.

TABLE ONE

OS Filter Process Parameter Values

| Parameter | Thermal Noise Estimator | Interference Estimator |
| --- | --- | --- |
| N | 256 | 128 |
| FFT Length | 16 | 128 |
| Window Type | Kaiser12 | Kaiser12 |
| Percentile | 5% | 5% |

On each radar cycle, a number (e.g., 256) of time-domain data samples 504 of received RF signal 114 are received by OS filter 500 (after DC components have been removed by DC removal module 402). To achieve reasonable accuracy in determining the noise estimates and detection metric, a large enough sample set must be used to reduce the expected uncertainty to a reasonably small value. Blanker 506 discards all but N samples of the data 504, wherein parameter N 508 is selected based on whether thermal noise 205 or interference 207 is being estimated. In the exemplary embodiment, if thermal noise 205 is to be estimated, all 256 data samples are utilized. If interference level 207 is to be estimated, half (e.g., 128) of the data samples may be discarded. A goal of using a larger N time interval sample set for estimating thermal noise 205 is to include for analysis at least one time interval in which the intermittent interference signal is not present, so that the interfering signal and the RF SOI do not mask one another at identical or overlapping frequencies. Blanker 506 then output N time-domain samples 510 to STFTM module 512. STFTM module 512 performs a non-overlapping short-time Fourier transform magnitude operation on the N time-domain samples 510, resulting in a frequency domain representation of the time interval data including a magnitude level for each of a plurality of frequencies at which signals are present in the received RF signal 114. STFTM module 512 utilizes two additional inputs, a FFT length parameter 514 and a window function 516. FFT length parameter 514 may be selected to be short for thermal noise estimation, to increase the number of transform operations and the probability that no interfering signal is present in the analyzed time interval data. In contrast, in estimating interference, FFT length parameter 514 may be selected to be an extended time interval, e.g., equal to the number N of the time domain samples 510. Window function 516 is generated by window module 518, which accepts as an input the FFT length parameter 514 and window type parameter 520 (e.g., a Kaiser window, etc.). Window function 516 operates to reduce sidelobe energies of the frequency domain representations of the spectral data resulting from the STFTM window approximation operation.

STFTM spectral output data 522 is then sorted by magnitude in ascending order by sorting function 524. Sorted spectral magnitude data 526 is then passed from sorting function 524 to Rayleigh parameter estimator 528. The Rayleigh parameter estimator 528 operates (as described in detail below) to generate a raw sigma estimate a. 534, which could comprise raw noise $\sigma_m$ 408 or raw interference plus noise $\sigma_{ri+n}$ 410 of FIG. 4, depending upon which variance is being estimated in the particular embodiment of OS filter 500.

Figure 5B:
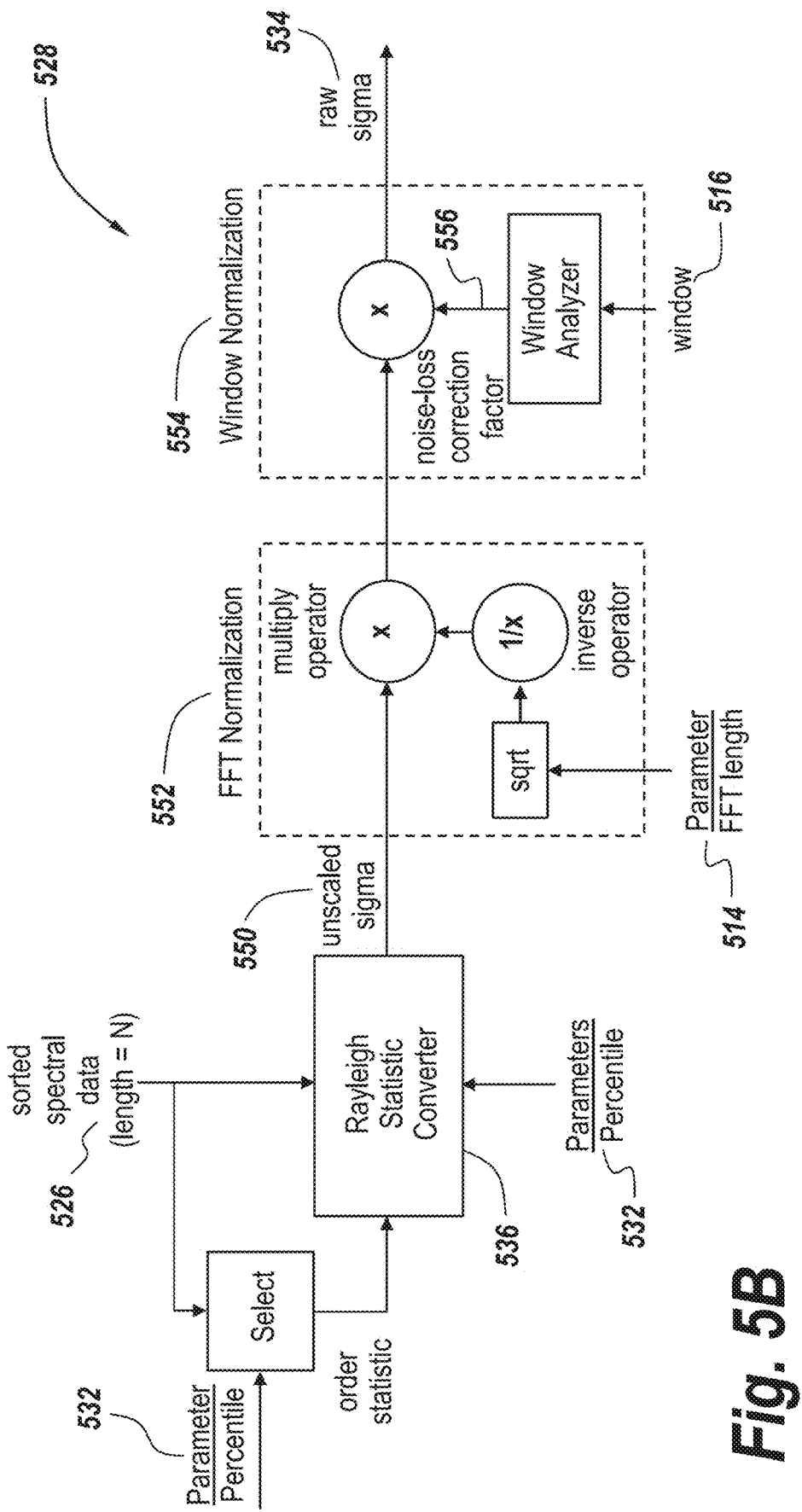
Figure 5C:
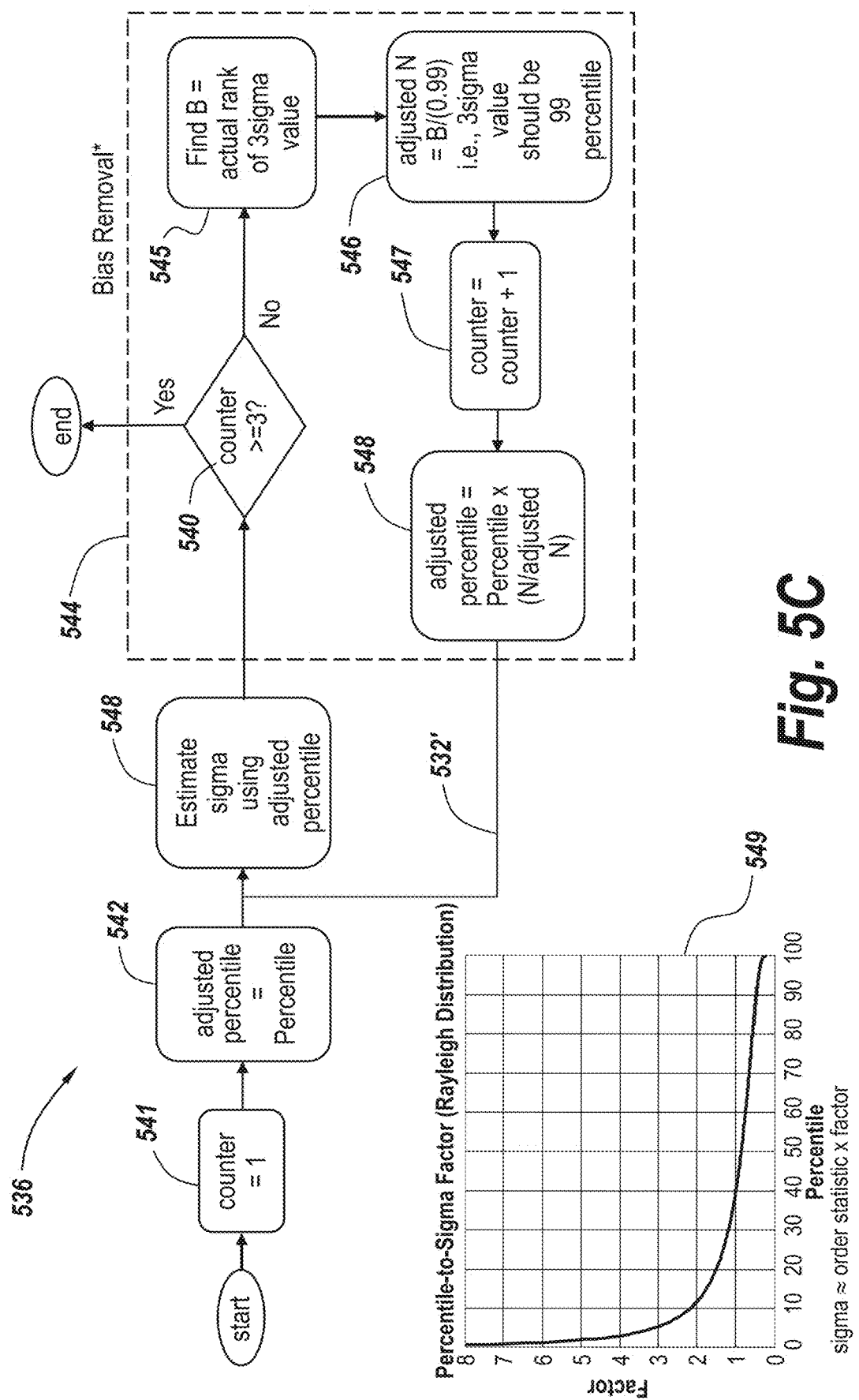

The operation of Rayleigh parameter estimator 528 will now be described with additional reference to FIGS. 5B and 5C. In order to generate raw sigma estimate $\sigma_{raw}$ 534, parameter estimator 528 first iteratively generates an unscaled estimate $\sigma_{unscaled}$ 550 at Rayleigh statistic converter 536, and then performs FFT normalization 552 and window normalization 554 on unscaled estimate $\sigma_{unscaled}$ 550 to obtain the raw sigma estimate $\sigma_{raw}$ 534. Rayleigh parameter estimator 528 estimates the raw sigma estimate $\sigma_{raw}$ 534 under which the assumption that the sorted spectral data 526 is a random variable having a Rayleigh distribution (as shown in FIG. 5A). The Rayleigh distribution has one parameter, $\sigma$, which is the same as being estimated by the Rayleigh parameter estimator 528, i.e., raw sigma estimate 534. The sorted spectral data 526, however, may include signal components that disturb the Rayleigh distribution. Non-arithmetic estimates are plotted against distribution 502 to illustrate different "modes" in the spectrum. Each mode corresponds to a single component in the receive RF signal, including the desired RF SOI 116 and the degrading interference signal 118. An advantageous operating principle of the order statistics analyses utilized in the embodiments is the data populating the left-most portion of the probability distribution plot 502 comprises predominantly, if not exclusively, thermal noise 205 or interference plus noise data. Data representing the RF SOI 116 and degrading RF interference signal 118 end up plotted towards the far right portion of the distribution 502, as shown for explanatory purposes only. As shown in FIG. 5B, Rayleigh statistic converter 536 receives as an initial input the reference percentile parameter 532 (e.g., 5% of the probability distribution) and the sorted spectral magnitude data 526. Rayleigh statistic converter 536 represents a function that generates and iteratively refines the accuracy of unscaled estimate $\sigma_{unscaled}$ 550 based on these inputs and measures of bias present in the instant estimate. As shown in FIG. 5C, Rayleigh statistic converter 536 initializes (block 541) a counter and initializes (block 542) an adjusted percentile raw estimate to the input reference percentile parameter 532. An iterative process (blocks 538 and 544) is then performed to remove any corruption bias that may be present in the raw estimate a. 534 due to the presence of outliers (e.g., from reflected target objects signals, interference, etc.) in the Rayleigh distribution 502. For example, if half of the sorted spectral magnitude data 526 are corrupted by outliers, this could cause roughly a 10% error in the raw estimate $\sigma_{raw}$ 534. In order to remove the corruption bias, the raw estimate $\sigma_{raw}$ 534 is recalculated (in block 538) iteratively with adjustments in an adjusted reference percentile 532'.

On each iteration, an iteration counter is checked (block 540), and if the counter has not exceeded a defined threshold (e.g., 3 iterations), a current bias is determined (block 545) by investigating the actual rank of a three standard deviation (3σ) value in the sorted and plotted spectral magnitude plot 502 and adjusting (blocks 546 and 548) the adjusted reference percentile 532' such that the 3σ value represents a 99$^{th}$ percentile in the sorted spectral magnitude plot 502. The iterative loop counter is also incremented in block 547. When the counter is determined (block 540) to meet or exceed the iterative loop count, the bias removal process ceases and Rayleigh statistic converter 536 outputs the current unscaled estimate $\sigma_{unscaled}$ 550, whereupon it undergoes FFT normalization 552 and window normalization 554. FFT normalization 552 compensates for scaling introduced by using different FFT lengths in STFTM module 512. The unscaled a estimate 550 is multiplied by a correction factor comprising the inverse square root of the FFT length parameter 514. Window normalization 554 applies a noise-loss correction factor to compensate for underestimation error introduced in the time domain by the application of window function 516. The output of window normalization is a compensated raw noise estimate arm 534.

Figure 6A:
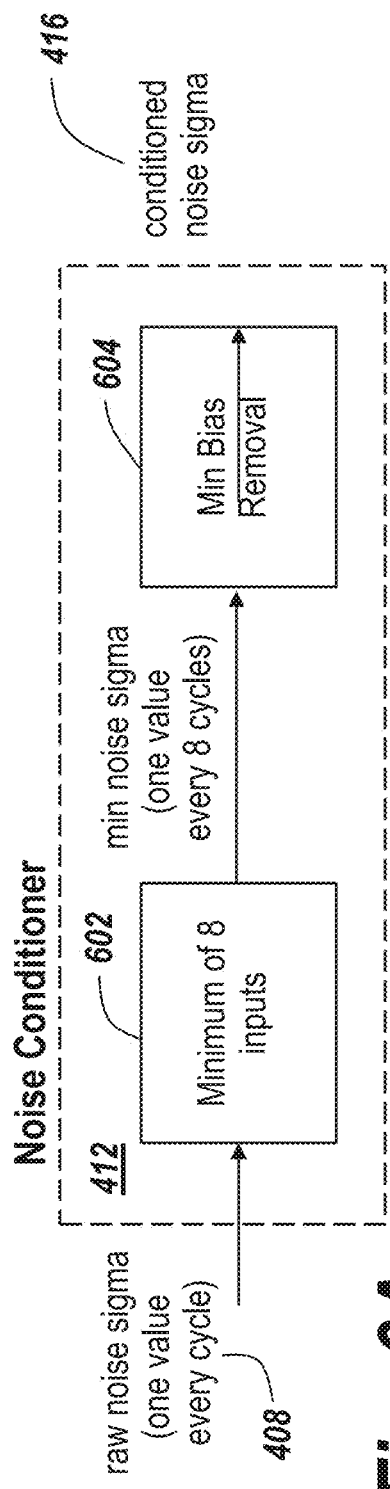
FIGS. 6A and 6B are schematic functional block diagrams illustrating embodiments of noise conditioners.
Figure 6B:
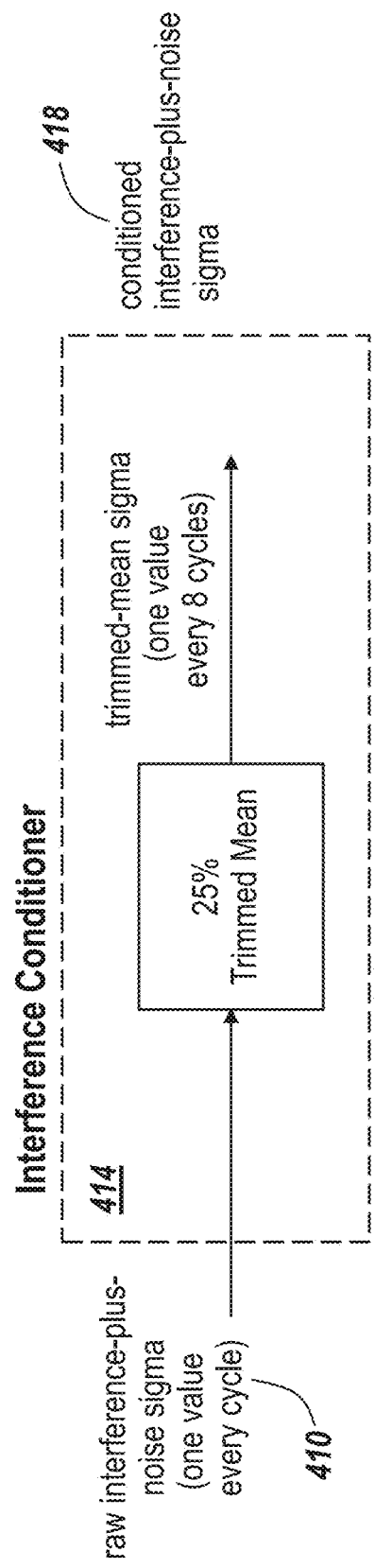

With reference again to FIG. 4, OS filters 404, 406 output respectively raw noise estimate am 408 and raw interference plus noise estimate $\sigma_{ri+n}$ 410. The raw noise estimate $\sigma_{rn}$ 408 is output on each cycle of the RF receiver to noise conditioner 412, details of which are shown in FIG. 6A. In the embodiment shown, noise conditioner 412 gathers raw noise estimates $\sigma_{rn}$ 408 (block 602) over a predefined number (e.g., 8) of RF receiver cycles, and selects for output the minimum value of the collected set, i.e., the noise a least corrupted by noise of interference. The selected minimum noise a has corrupting bias removed (block 604), and the conditioned noise estimate $\sigma_{cn}$ 416 is then output from noise conditioner 412. FIG. 6B shows details of the operation of an embodiment of interference conditioner 414, which receives raw interference plus noise estimate $\sigma_{ri+n}$ 410 over a similar number of RF receiver cycles and performs a 25% trimmed mean operation thereupon. That is, from the (exemplary) 8 samples received, interference conditioner 414 discards the largest two values and the two smallest values, and outputs as the conditioned interference plus noise estimate $\sigma_{ci+n}$ 418 the average of the remaining input samples.

Figure 7:
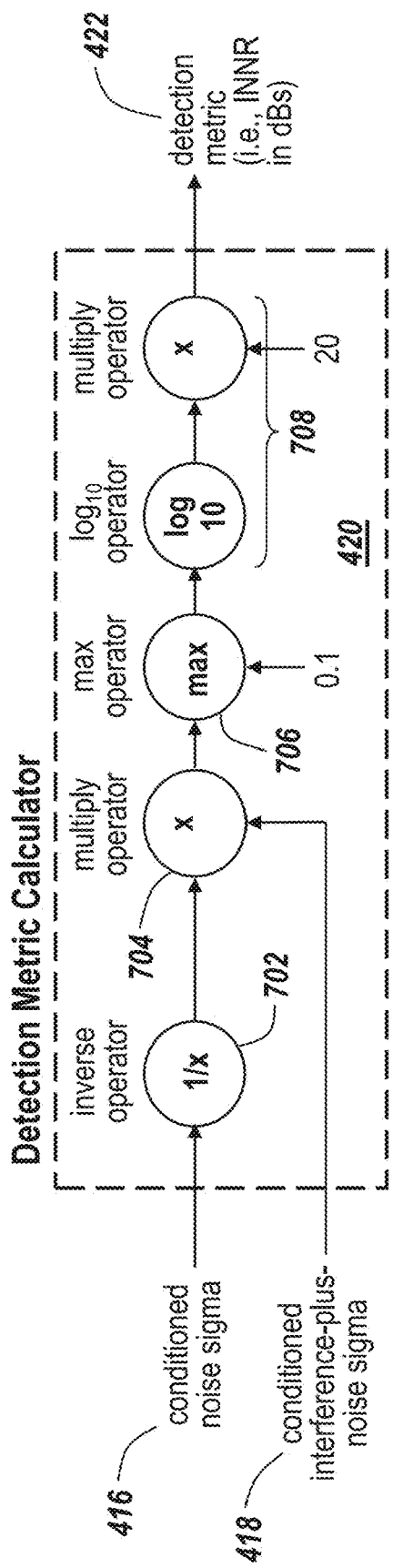
FIG. 7 is a schematic functional block diagram illustrating an embodiment of an interference detection metric calculator.
Figure 8:
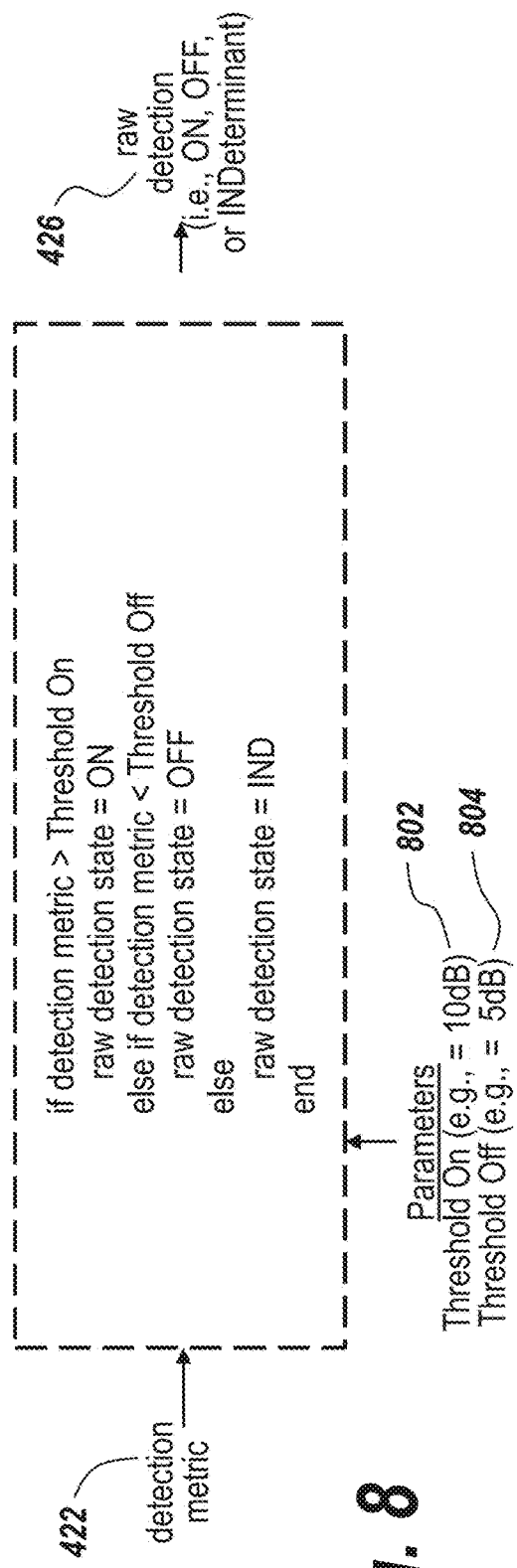
FIG. 8 is a schematic functional block diagram illustrating an embodiment of interference detection logic.

With reference again to FIG. 4, conditioned noise estimate a. 416 and conditioned interference plus noise estimate $\sigma_{ci+n}$ 418 are passed to detection metric calculator 420, exemplary functions of an embodiment of which are shown in FIG. 7. DMC 420 computes (blocks 702, 704) a ratio of the two values, applies a maximum operator (block 706) to reduce fluctuations in the ratio, and converts (block 708) the ratio in decibel (dB) units. DMC 420 outputs the detection metric 422. The detection metric 422 is then passed to detection logic 424 of the interference detector 400. An example embodiment of detection logic 424 is shown in FIG. 8, wherein detection logic 424 compares the detection metric 422 to respective values of an "On" threshold 802 and an "Off" threshold 804, and outputs raw detection state signal 426 that indicates the current state (i.e., On, Off, or indeterminate state where no changes to current actions is to be taken.) The detection state signal 426 may be passed to alert logic 428 of the interference detector 400, as shown in FIG. 4. Alternatively, the detection state signal 426 may immediately trigger or cease an alert or an invoked countermeasure application.

Figure 9:
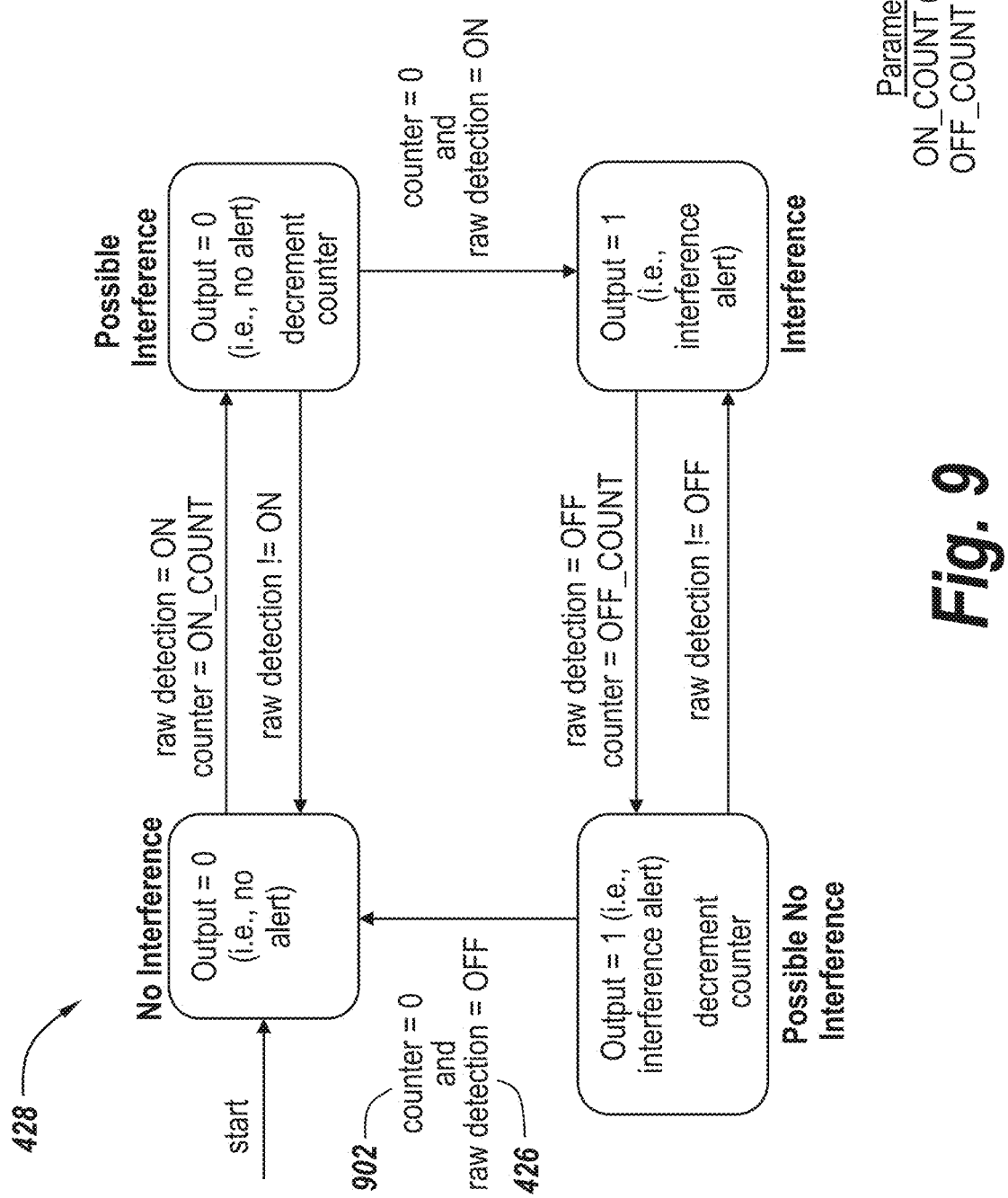
FIG. 9 is a schematic functional block diagram illustrating an embodiment of alert logic.

An example embodiment of Alert logic 428 is shown in FIG. 9, wherein the raw detection signal 426 and a counter 902 may be utilized to introduce RF receiver cycle-based delays by only taking actions, such as turning on or off alerts or countermeasures, after a predefined number of cycles in which a change in the raw detection signal 426 has been encountered.

Experimental Results

Interference detectors in accordance with the embodiments provide reliable detection of degrading interference in mild (e.g., receiver noise floor increases of 12-24 dB) to severe (e.g., 36 dB or greater increases) interference conditions. The incidences of false alarms given during conditions of no interference are extremely low.

Numerous Monte-Carlo simulations were performed to demonstrate the robustness of the degrading interference detection methods and detectors. Variables introduced into the simulations included RF detection scenario parameters such as numbers of target objects superposed in a region of interest being sensed by the sensor 100, object radar cross section, object ranges (from the sensor 100), object velocities, no interference conditions, and conditions of intermittent interference comprising an interference model including a repeating pattern of transmission followed by radio silence formed by adding a complex Gaussian random variable to each time-domain sample collected during any transmission period. Variations in receiver parameters were also employed, such as thermal noise standard deviations, IQ balance, and ADC quantization. Consistent transmission waveforms from the sensor 100 and interference control parameters (i.e., numbers of spectral data samples, noise and interference FFT lengths, noise percentile, window type, and detection thresholds, etc.) were utilized.

Figure 10A:
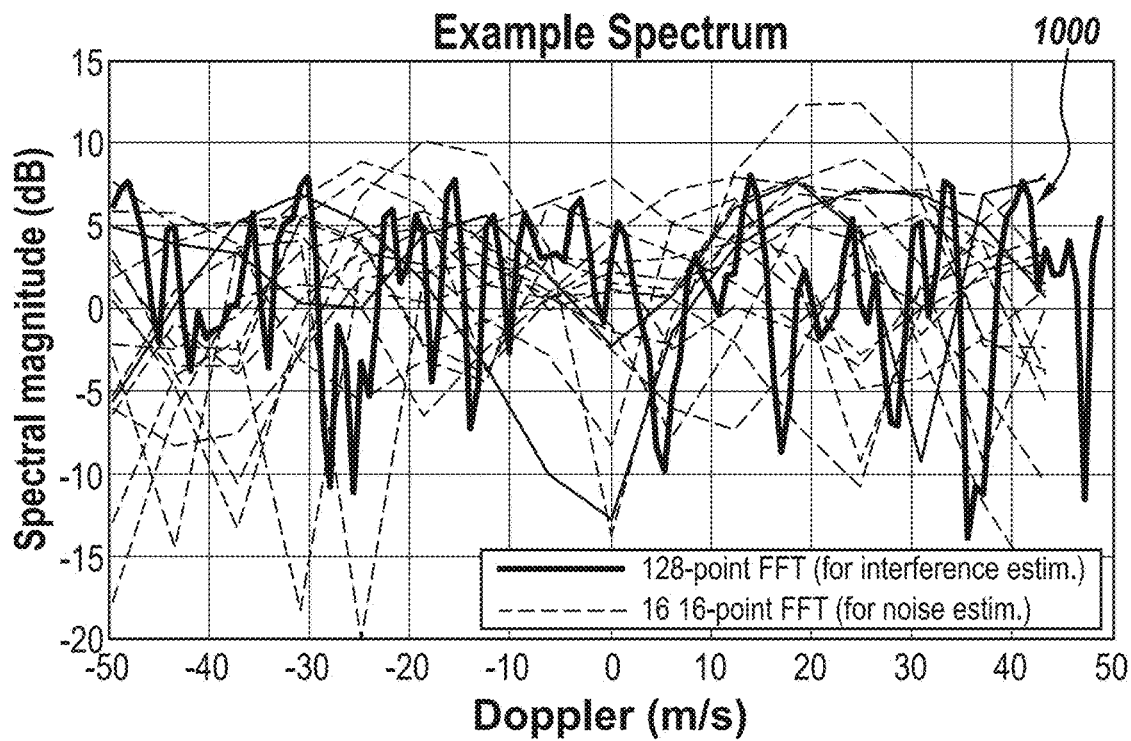
FIGS. 10A-10Q are signal plots of thermal noise, interference-plus-noise and detection metrics resulting from numerous simulation testing scenarios.
Figure 10B:
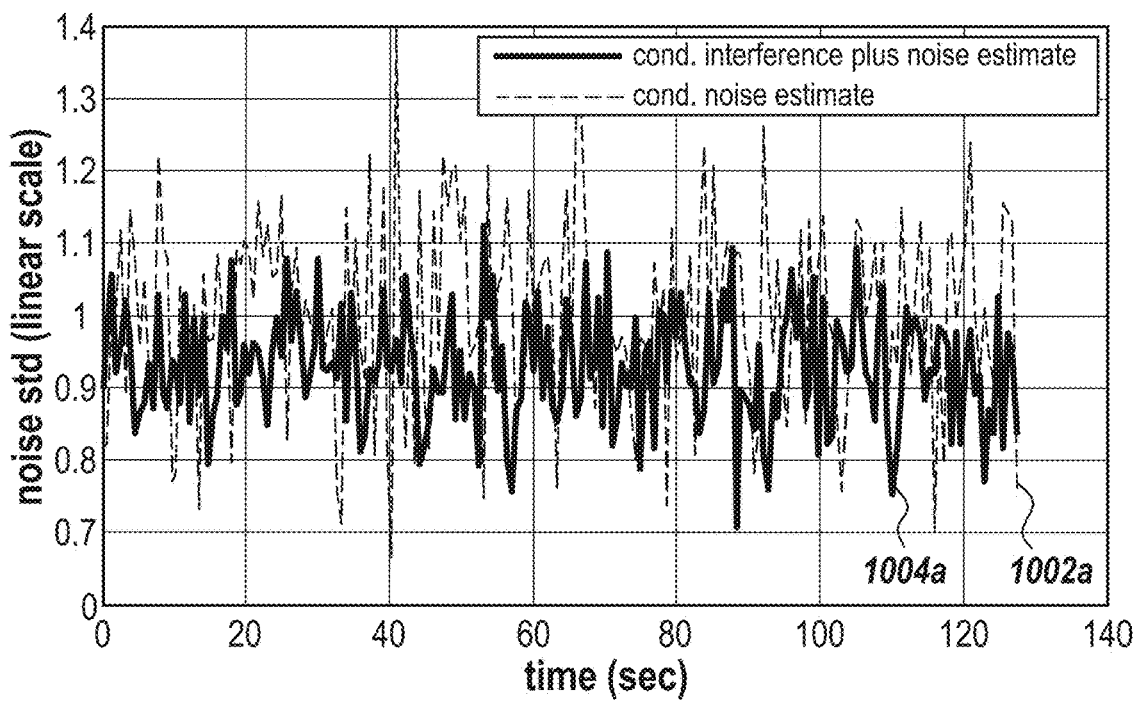
Figure 10C:
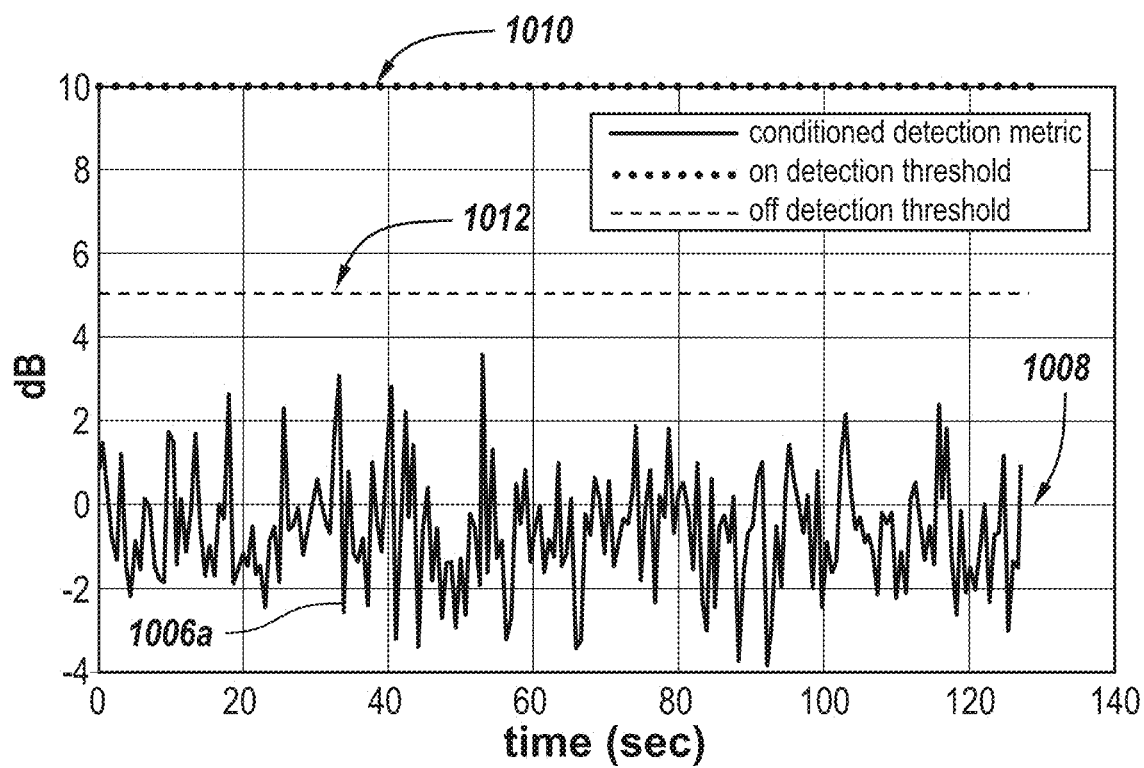

FIG. 10A shows an example of spectral magnitude values 1000 from which a 5% thermal noise reference percentile parameter was collected. The x-axis indicates frequency translated to Doppler in units of meters/second for a particular radar sensor. The y-axis provides spectral magnitude in decibels. FIG. 10A shows 17 separate spectra, one corresponding to a 128-point FFT used for interference estimation, and the remaining corresponding to the 16-point FFTs used for estimating thermal noise. These spectral values correspond to FFT normalization 522 of FIG. 5A. FIG. 10B shows, for a scenario of low thermal noise (stdev=1) and no interference, values over time of conditioned interference-plus-noise estimate 1002 (such as previously described $\sigma_{ci+n}$ 418) and conditioned noise estimate 1004 (such as previously described $\sigma_{cn}$ 416). The estimated noise levels 1002a, 1004a are consistent with the scenario parameters. FIG. 10C shows, for the same scenario, a detection metric 1006a (such as previously described metric 422) over time. The small variation of the metric 1006a from 0 dB level 1008, and significant value below both On detection threshold 1010 (e.g., threshold 802) and Off detection threshold 1012 (e.g., threshold 804) indicates that no interference energy is present.

Figure 10D:
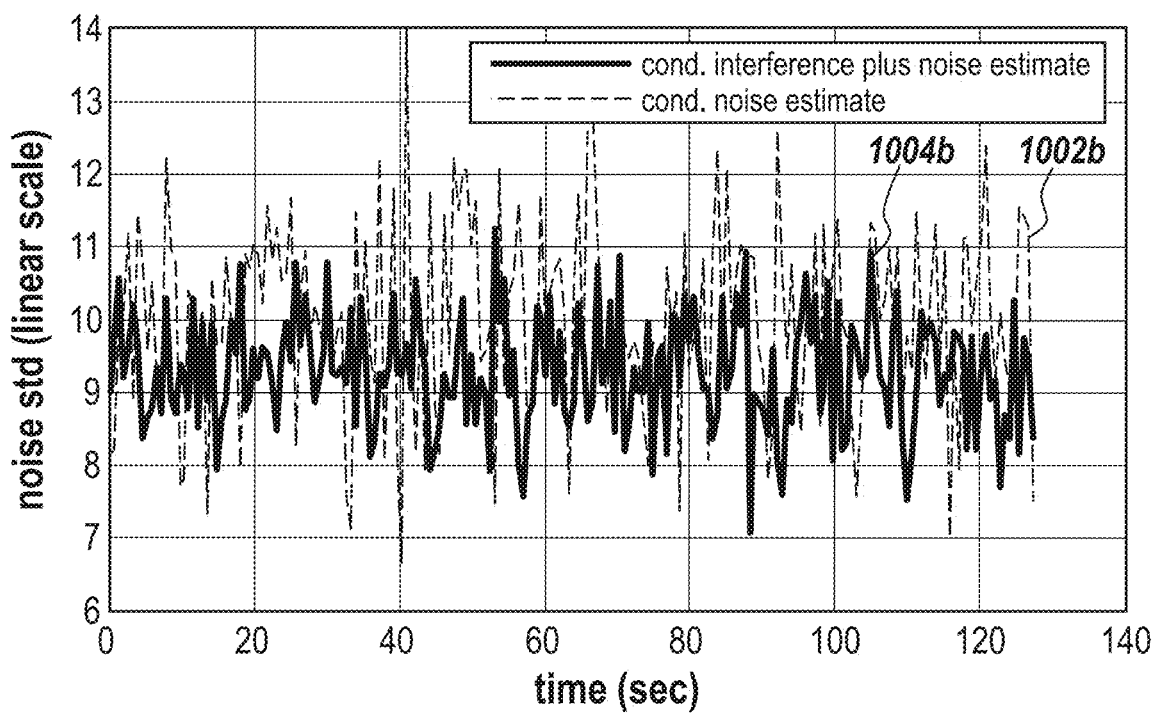
Figure 10E:
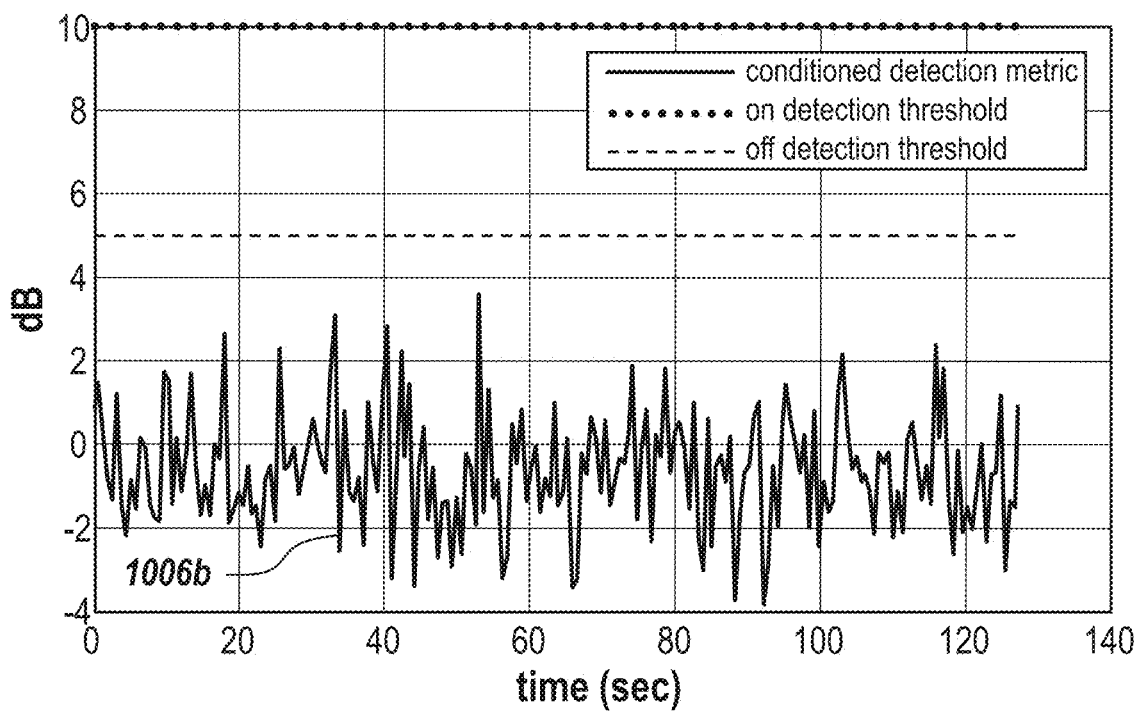

FIGS. 10D and 10E show, for a scenario of higher thermal noise (i.e., std dev of 10, versus 1 in the previous scenario) and no interference, the resulting noise levels 1002b, 1004b (e.g., corresponding to estimates 418 and 416 respectively) are correspondingly higher, but the detection metric 1006b is not disturbed by the higher noise level.

Figure 10F:
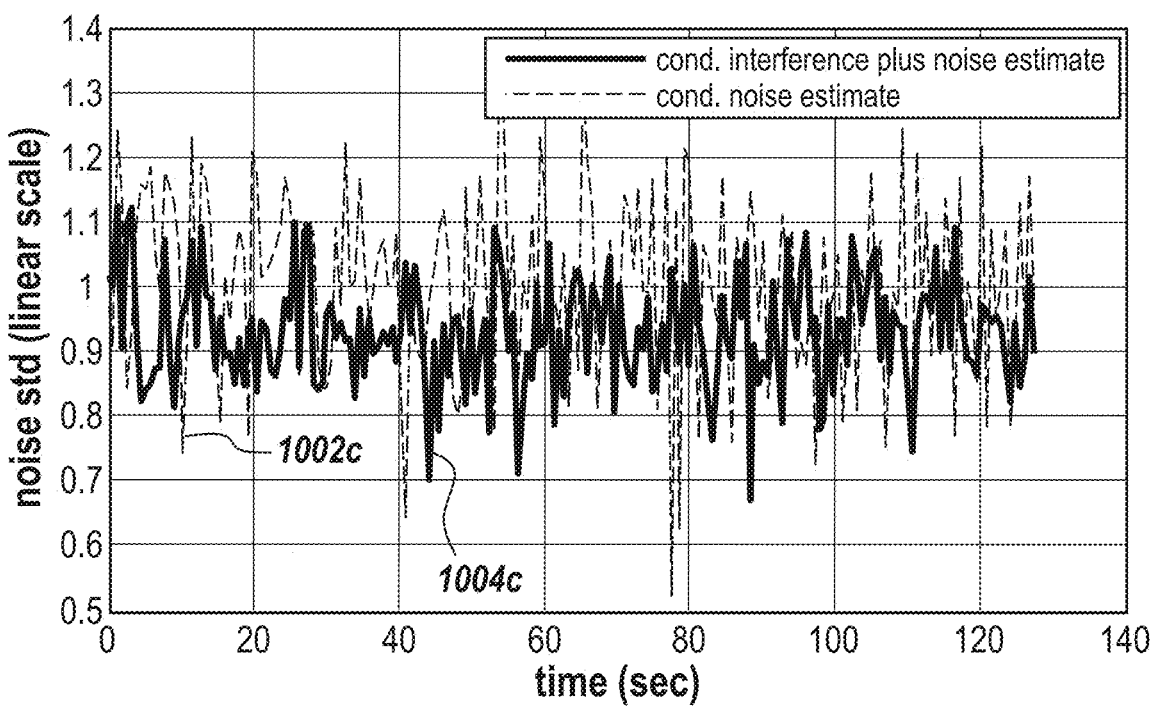
Figure 10G:
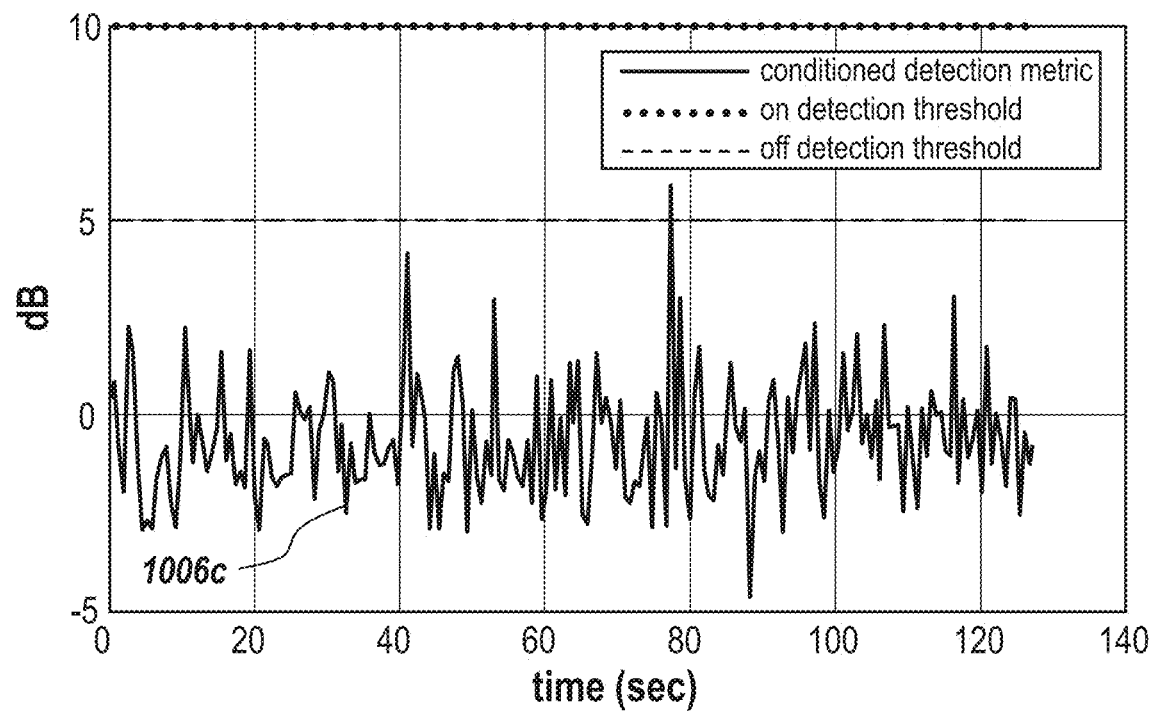

FIGS. 10F and 10G show resulting signals for a scenario of low thermal noise (std dev 1), and no interference, but in the presence of a single 10 m² target object at 4.5 m range and moving at 2.6 m/s. The noise levels 1002c, 1004c are centered about the stdev 1 axis, and the detection metric 1006c remains undisturbed by the presence of the target object.

Figure 10H:
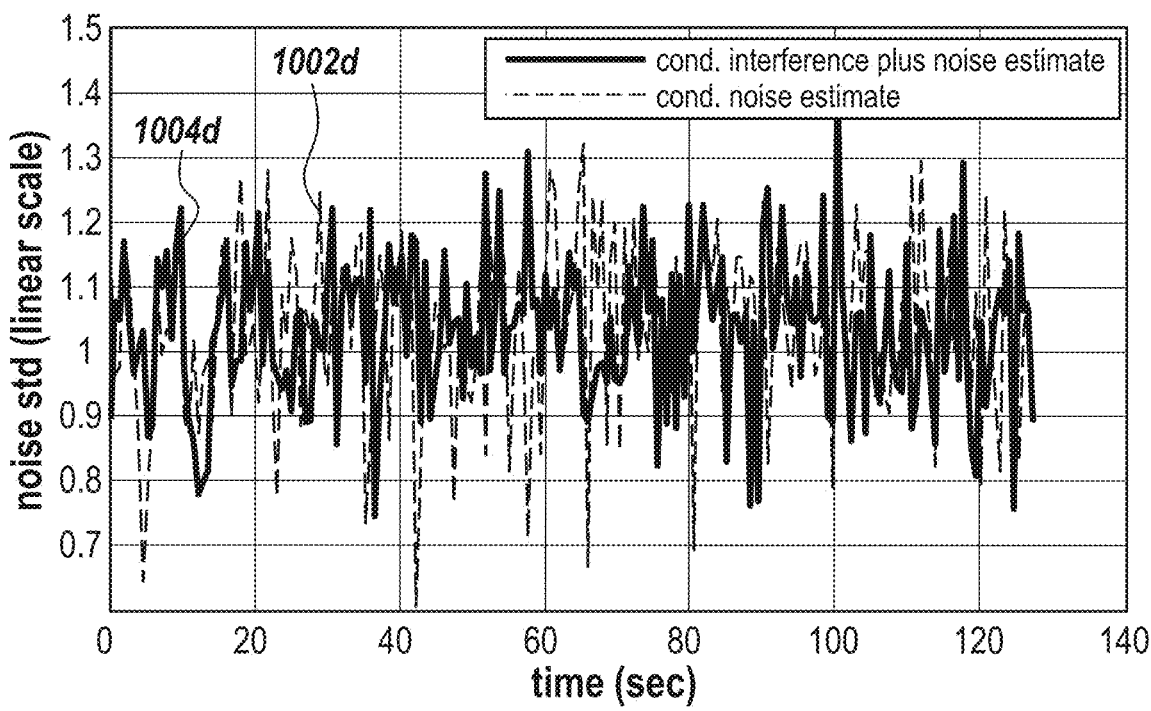
Figure 10I:
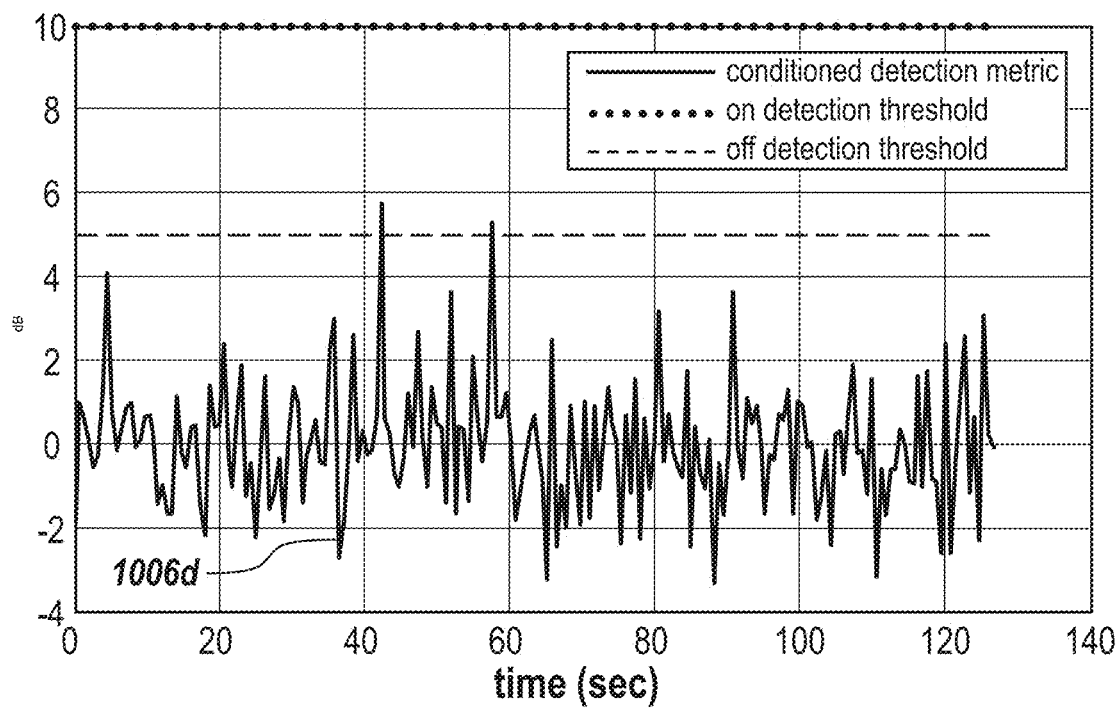

FIGS. 10H and 10I shown resulting signals for a scenario of low thermal noise and no interference, but in the presence of sixteen (16) 10 m² target objects. Again, the noise level 1002d, 1004d are commensurate with input noise, and the detection metric 1006d remains undisturbed by the presence of numerous target objects.

Figure 10J:
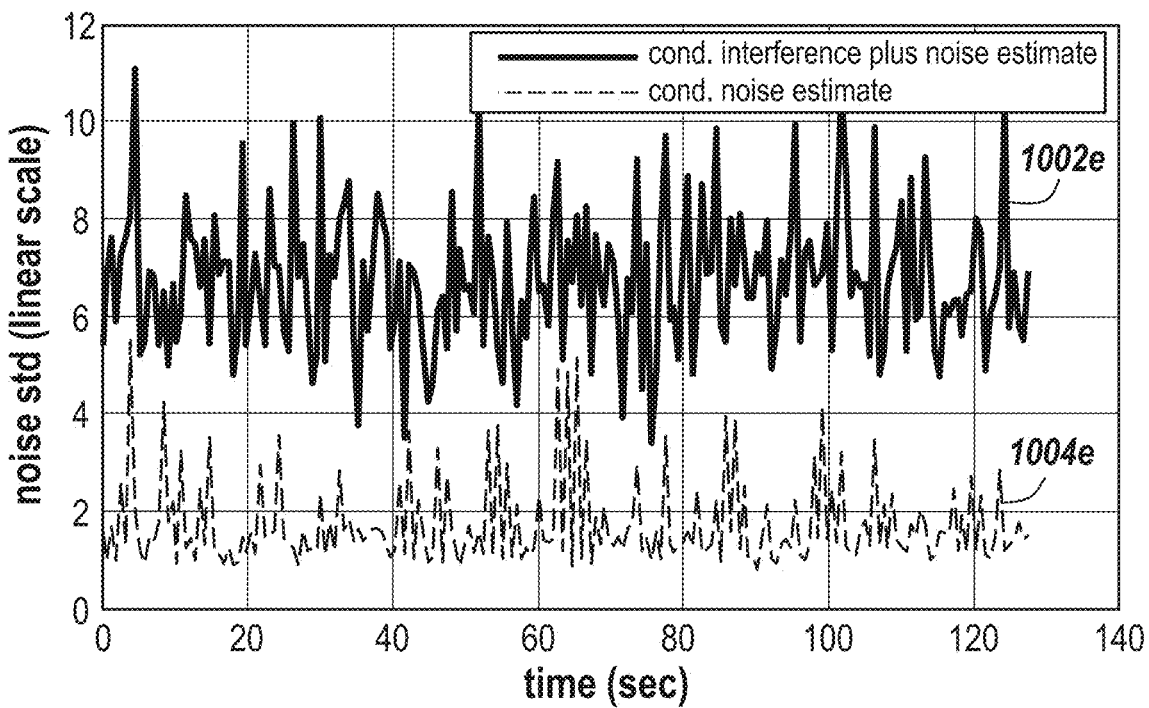
Figure 10K:
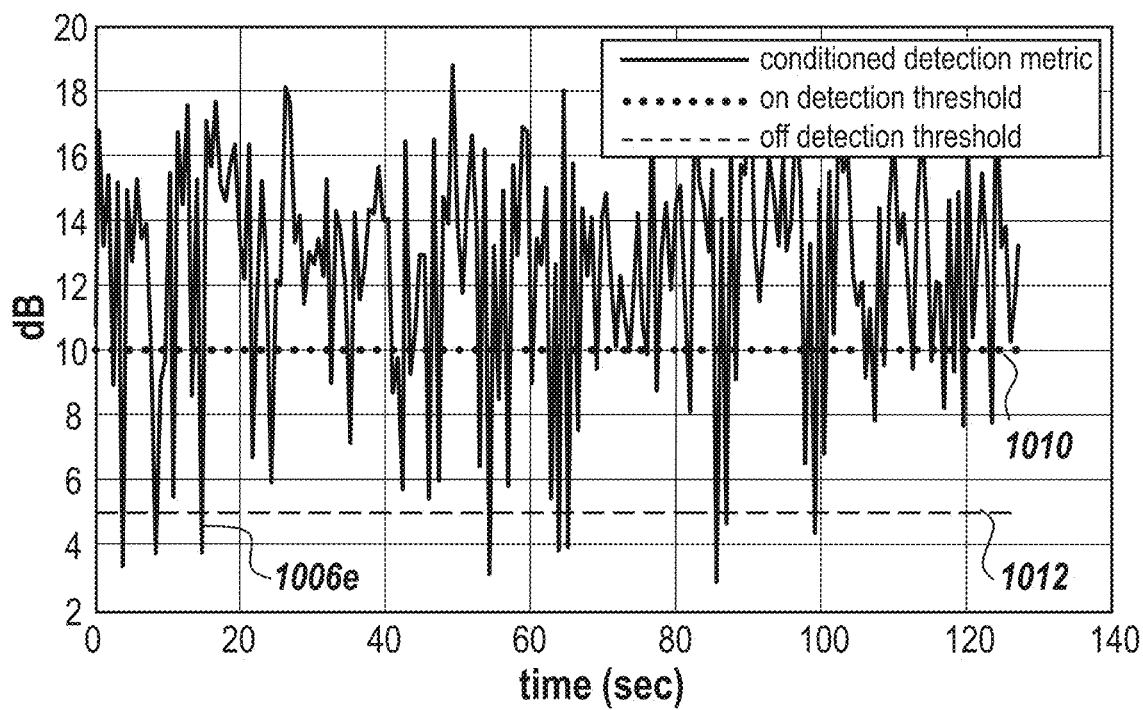

FIGS. 10J and 10K show resulting signals for a scenario of low thermal noise and no target objects, but with the model interference signal (stdev=10; interference-to-noise ratio=20 dB) applied. A higher conditioned interference plus noise estimate 1002e is shown, separate from the conditioned noise estimate 1004e. The interference detection metric 1006e now indicates the presence of the interfering signal, rising above both the On detection threshold 1010 and Off detection threshold 1012.

Figure 10L:
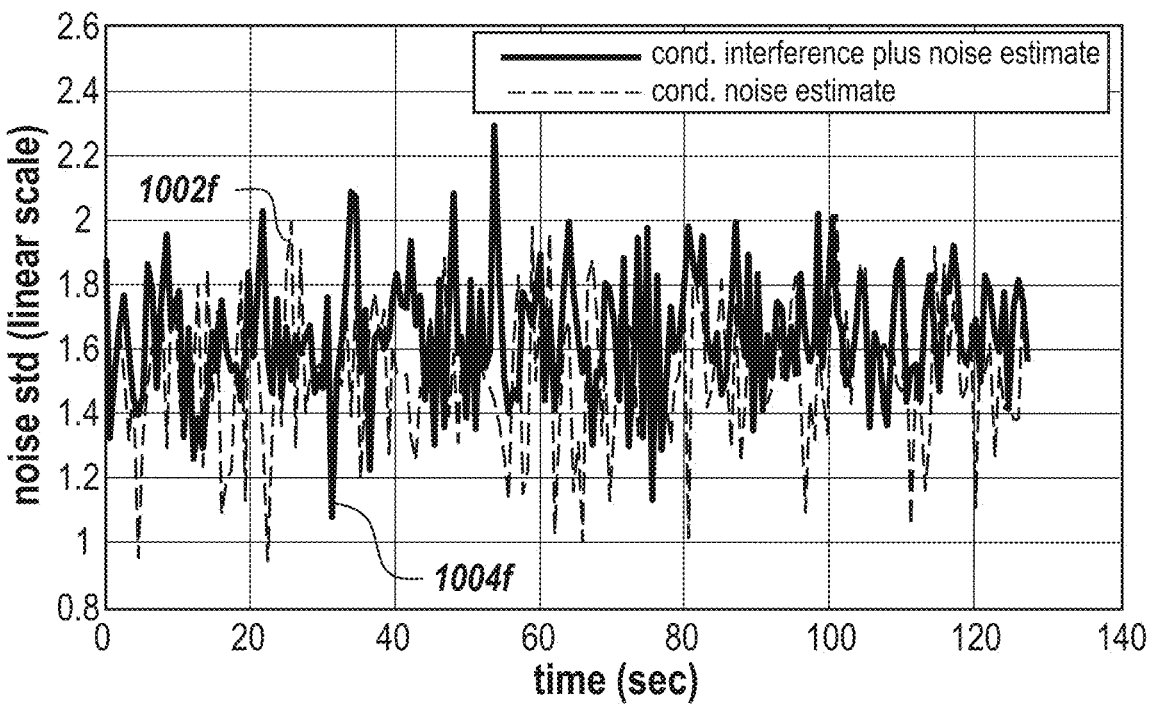
Figure 10M:
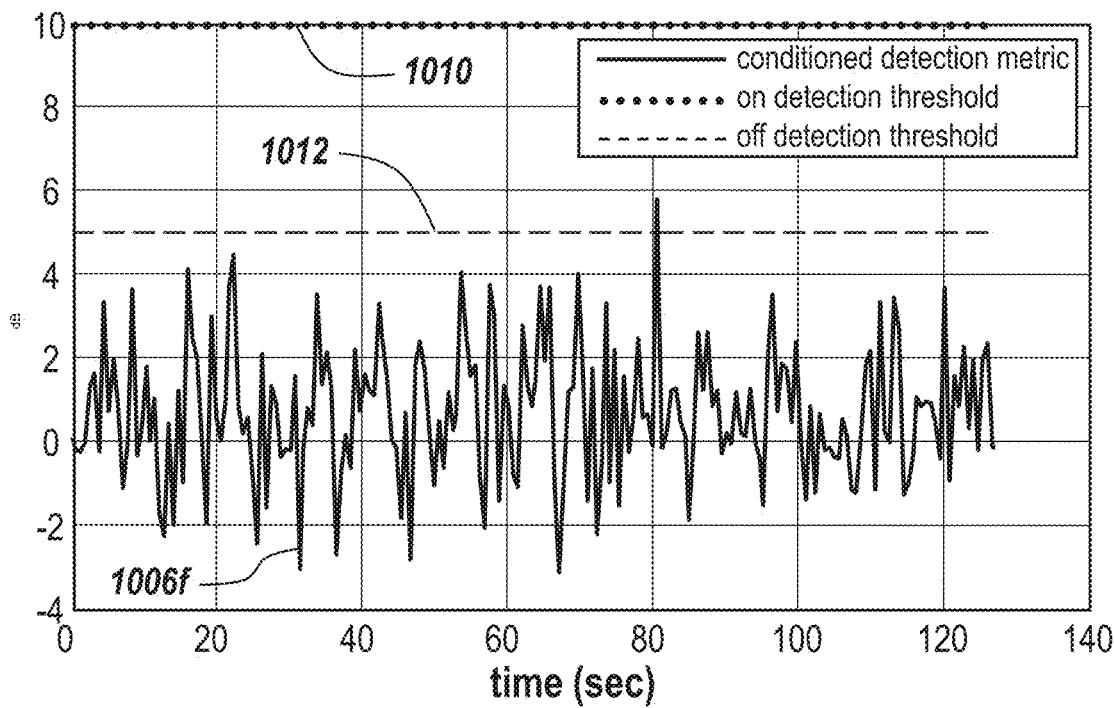

FIGS. 10L and 10M show resulting signals for a scenario of low thermal noise and no interference, in the presence of 16 target objects, and with a severe IQ imbalance (i.e., IQ amplitude balance=2; IQ phase balance=120°. The detection metric 1006f is not disturbed by the severe IQ imbalance. False alarms are not generated, as the detection metric 1006f is well below the On threshold 1010 and only exceeds the Off threshold 1012 briefly.

Figure 10N:
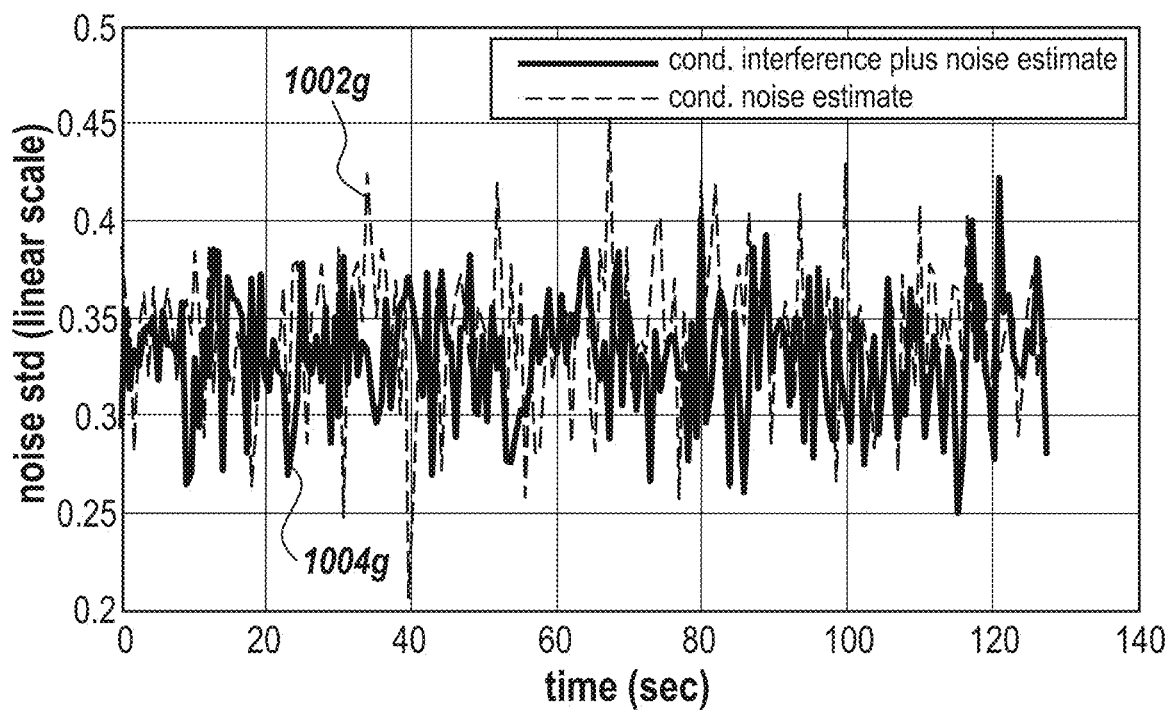
Figure 10O:
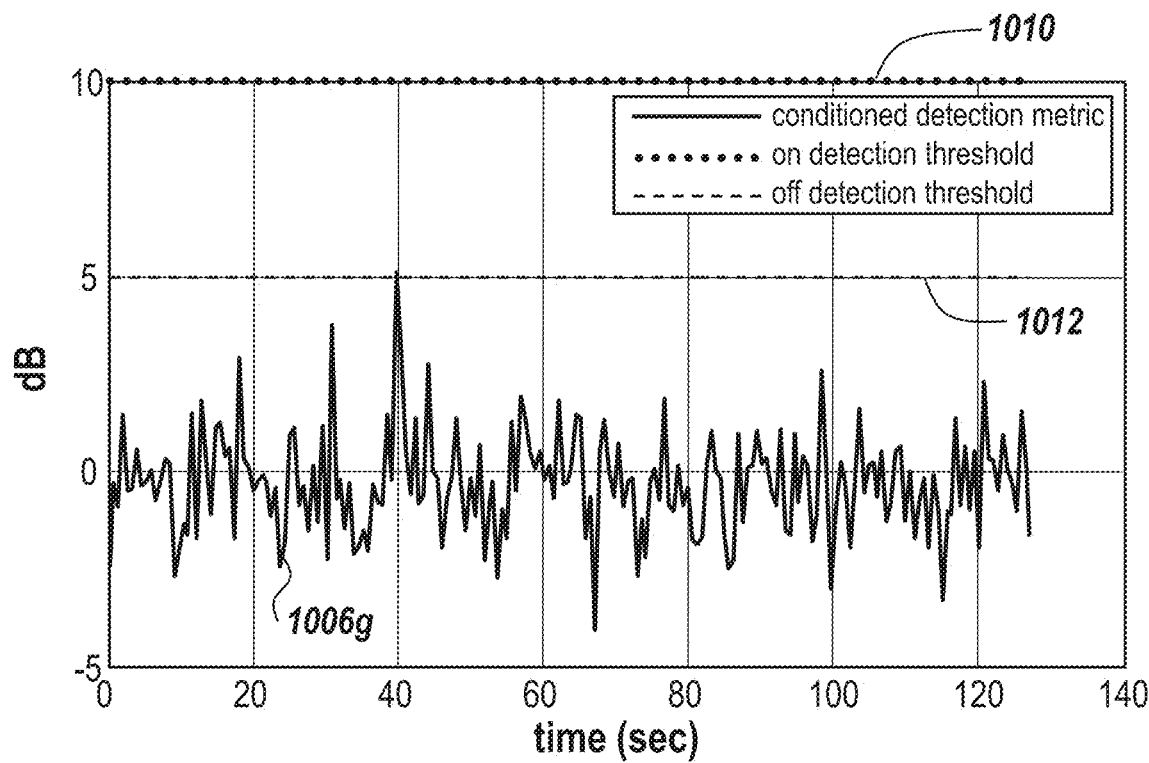

FIGS. 10N and 10O show resulting signals for a scenario of the thermal noise floor being below an ADC quantization bit of the simulated RF receiver, for example where the thermal noise stdev=0.128, is 3 bits below the quantization bit, in the presence of no interference and 16 target objects. In this scenario, the noise levels 1002g, 1004g are increased equally, the detection metric 1006g is not disturbed, and no false alarms are generated.

Figure 10P:
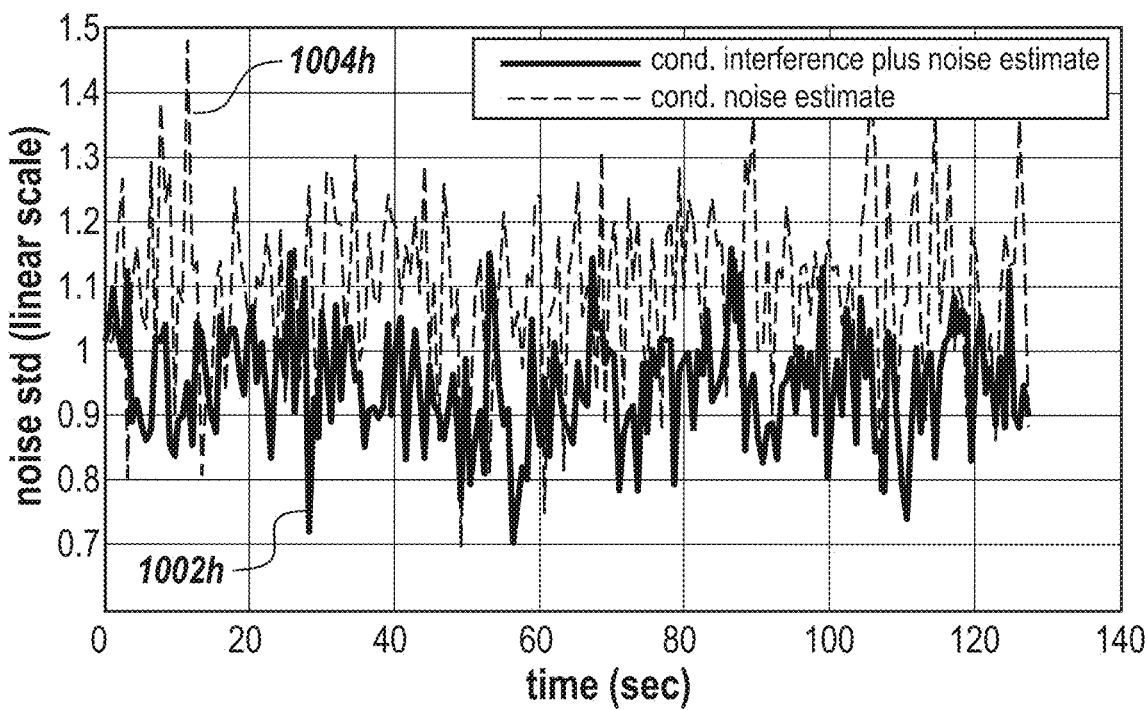
Figure 10Q:
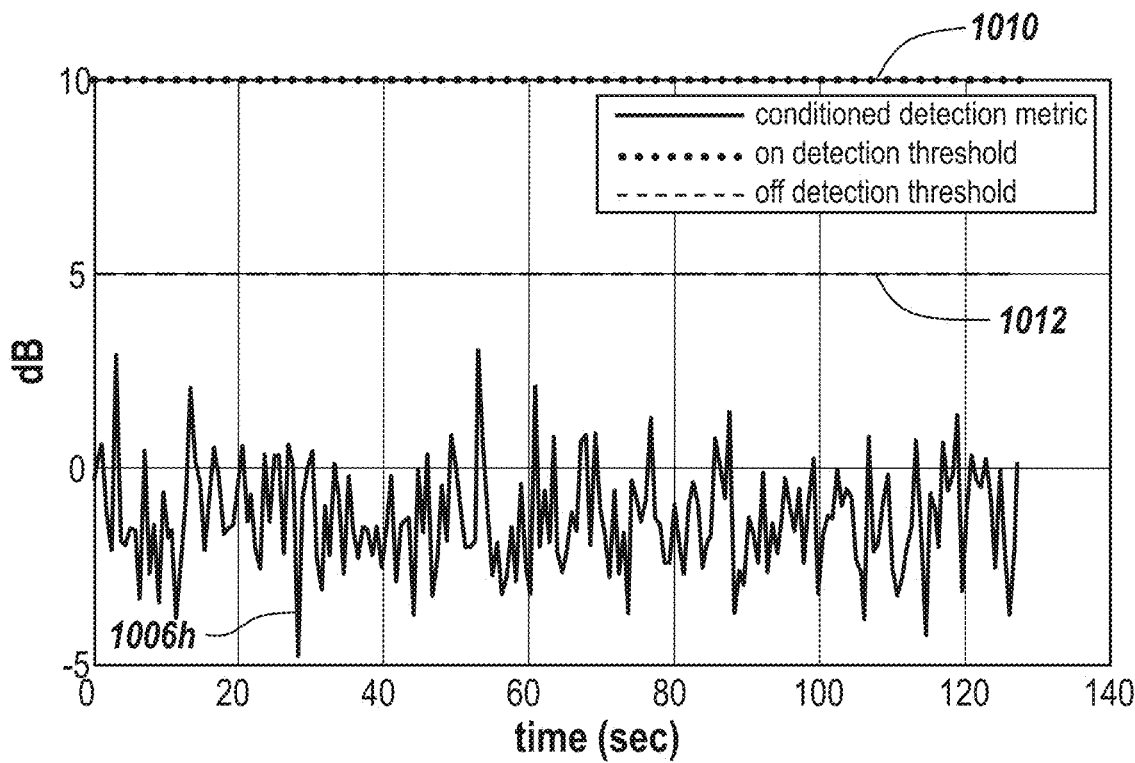

FIGS. 10P and 10Q show resulting signals for a scenario of low thermal noise, in the presence of no interference, but in the presence of a massively large (1000 m²) target object, at close range (0.5 m) and impossibly fast acceleration (1000 m/s²). There is a slight separation between the lower conditioned interference plus noise estimate 1002h and the conditioned noise estimate 1004h, but the detection metric 1006h is not significantly disturbed, and no false alarms are issued.

Various embodiments of the above-described RF receivers, detectors and methods may be implemented in digital electronic circuitry, in computer hardware, firmware, and/or software. The implementation can be as a computer program product (i.e., a computer program tangibly embodied in an information carrier). The implementation can, for example, be in a machine-readable storage device and/or in a propagated signal, for execution by, or to control the operation of, data processing apparatus. The implementation can, for example, be a programmable processor, a computer, and/or multiple computers.

A computer program can be written in any form of programming language, including compiled and/or interpreted languages, and the computer program can be deployed in any form, including as a stand-alone program or as a subroutine, element, and/or other unit suitable for use in a computing environment. A computer program can be deployed to be executed on one computer or on multiple computers at one site.

Method steps can be performed by one or more programmable processors and/or controllers executing a computer program to perform functions of the invention by operating on input data and generating output. Method steps can also be performed by, and an apparatus can be implemented as, special purpose logic circuitry. The circuitry can, for example, be a FPGA (field programmable gate array) and/or an ASIC (application-specific integrated circuit). Modules, subroutines, and software agents can refer to portions of the computer program, the processor, the special circuitry, software, and/or hardware, e.g., a controller such as a microcontroller, which implements that functionality.

Processors suitable for the execution of a computer program include, by way of example, both general and special purpose microprocessors, and any one or more processors of any kind of digital computer. Generally, a processor receives instructions and data from a read-only memory or a random access memory or both. The essential elements of a computer are a processor for executing instructions and one or more memory devices for storing instructions and data. Generally, a computer can be operatively coupled to receive data from and/or transfer data to one or more mass storage devices for storing data, e.g., magnetic, magneto-optical disks, or optical disks.

Data transmission and instructions (e.g., for process control parameter selection, etc.) can also occur over a communications network. Information carriers suitable for embodying computer program instructions and data include all forms of non-volatile memory, including by way of example semiconductor memory devices. The information carriers can, for example, be EPROM, EEPROM, flash memory devices, magnetic disks, internal hard disks, removable disks, magneto-optical disks, CD-ROM, and/or DVD-ROM disks. The processor and the memory can be supplemented by and/or incorporated in special purpose logic circuitry.

To provide for interaction with a user, the above described techniques can be implemented on a computer having a display device. The display device can, for example, be a cathode ray tube (CRT) and/or a liquid crystal display (LCD) monitor. The interaction with a user can, for example, be a display of information to the user and a keyboard and a pointing device, e.g., a mouse or a trackball, by which the user can provide input to the computer, e.g., interact with a user interface element. Other kinds of devices can be used to provide for interaction with a user. Other devices can, for example, be feedback provided to the user in any form of sensory feedback, e.g., visual feedback, auditory feedback, or tactile feedback. Input from the user can, for example, be received in any form, including acoustic, speech, and/or tactile input.

The above described techniques can be implemented in a distributed computing system that includes a back-end component. The back-end component can, for example, be a data server, a middleware component, and/or an application server. The above described techniques can be implemented in a distributing computing system that includes a front-end component. The front-end component can, for example, be a client computer having a graphical user interface, a Web browser through which a user can interact with an example implementation, and/or other graphical user interfaces for a transmitting device. The components of the system can be interconnected by any form or medium of digital data communication, e.g., a communication network. Examples of communication networks include a local area network (LAN), a wide area network (WAN), the Internet, wired networks, and/or wireless networks.

The system can include clients and servers. A client and a server are generally remote from each other and typically interact through a communication network. The relationship of client and server arises by virtue of computer programs running on the respective computers and having a client-server relationship to each other.

Packet-based networks can include, for example, the Internet, a carrier internet protocol (IP) network, e.g., local area network (LAN), wide area network (WAN), campus area network (CAN), metropolitan area network (MAN), home area network (HAN)), a private IP network, an IP private branch exchange (IPBX), a wireless network, e.g., radio access network (RAN), 802.11 network, 802.16 network, general packet radio service (GPRS) network, Hiper-LAN), and/or other packet-based networks. Circuit-based networks can include, for example, the public switched telephone network (PSTN), a private branch exchange (PBX), a wireless network, e.g., RAN, Bluetooth, code-division multiple access (CDMA) network, time division multiple access (TDMA) network, global system for mobile communications (GSM) network), and/or other circuit-based networks.

The computing system can also include one or more computing devices. A computing device can include, for example, a computer, a computer with a browser device, a telephone, an IP phone, a mobile device, e.g., cellular phone, personal digital assistant (PDA) device, laptop computer, electronic mail device, and/or other communication devices. The browser device includes, for example, a computer, e.g., desktop computer, laptop computer, with a World Wide Web browser, e.g., Microsoft® Internet Explorer® available from Microsoft Corporation, Mozilla® Firefox available from Mozilla Corporation. The mobile computing device includes, for example, a Blackberry®, iPAD®, iPhone® or other smartphone device.

Whereas many alterations and modifications of the disclosure will no doubt become apparent to a person of ordinary skill in the art after having read the foregoing description, it is to be understood that the particular embodiments shown and described by way of illustration are in no way intended to be considered limiting. Further, the subject matter has been described with reference to particular embodiments, but variations within the spirit and scope of the disclosure will occur to those skilled in the art. It is noted that the foregoing examples have been provided merely for the purpose of explanation and are in no way to be construed as limiting of the present disclosure.

While the present disclosure has been described with reference to example embodiments, it is understood that the words that have been used herein, are words of description and illustration, rather than words of limitation. Changes may be made, within the purview of the appended claims, as presently stated and as amended, without departing from the scope and spirit of the present disclosure in its aspects.

Although the present disclosure has been described herein with reference to particular means, materials and embodiments, the present disclosure is not intended to be limited to the particulars disclosed herein; rather, the present disclosure extends to all functionally equivalent structures, methods and uses, such as are within the scope of the appended claims.

What is claimed is:

1. A method of detecting RF interference, comprising the steps of:
    receiving an RF signal detected at a receiver, the received RF signal including a desired RF signal and potentially an intermittent interference signal occupying an interference bandwidth;
    estimating thermal noise of the receiver, at an interference detection controller and/or processor, by statistically analyzing a plurality of time intervals of data of the received RF signal, including at least one time interval not including the intermittent interference signal;
    estimating an intermittent-interference-plus-noise level, at an interference detection controller and/or processor, by statistically analyzing an extended time interval of the time intervals of data;
    determining an interference metric, at an interference detection controller and/or processor, based on a ratio of the estimated intermittent-interference-plus-noise level to the estimated thermal noise; and
    evaluating the interference metric, at an interference detection controller and/or processor, against one or more thresholds to detect the presence or absence of degrading RF interference.

2. The method of claim 1, wherein statistically analyzing comprises application of order statistic filtering.

3. The method of claim 1, wherein:
    estimating the thermal noise of the receiver further comprises
    obtaining a frequency domain representation of the plurality of time intervals, the frequency domain representation including a magnitude level for each of a plurality of frequencies sorted in an order statistic distribution,
    determining a value associated with a thermal-noise reference percentile relative to the distribution as a raw thermal noise estimate, and
    conditioning the raw thermal noise estimate to compensate for estimation bias in order to obtain the thermal noise estimate; and
    estimating the intermittent-interference-plus-noise level further comprises
    obtaining a frequency domain representation of the extended time interval, the frequency domain representation including a magnitude level for each of a plurality of frequencies sorted in an order statistic distribution,
    determining a value associated with the reference percentile relative to the distribution as a raw intermittent-interference-plus-noise level estimate, and
    conditioning the raw intermittent-interference-plus-noise level estimate to compensate for estimation bias to obtain the intermittent-interference-plus-noise level estimate.

4. The method of claim 3, further comprising discarding a selected number of samples of the extended time interval prior to obtaining the frequency domain representation.

5. The method of claim 3, wherein the thermal-noise reference percentile comprises a standard deviation percentile along a Rayleigh distribution selected to be lower than representations of RF object reflections and degrading interference in the Rayleigh distribution.

6. The method of claim 3, wherein conditioning further comprises eliminating outlier and averaging remaining thermal noise or intermittent-interference-plus-noise level estimates, respectively, over several sampling cycles.

7. The method of claim 3, wherein obtaining the frequency domain representations further comprise respectively reducing sidelobe energies of the frequency domain representations through application of a window approximation.

8. The method of claim 7, further comprising respectively normalizing to compensate for time domain attenuation underestimations of the thermal noise and intermittent-interference-plus-noise level estimates resulting from the window approximation.

9. The method of claim 3, wherein:
    obtaining the frequency domain representations further comprises applying a FFT of respective lengths;
    the FFT length associated with the thermal noise estimation is a fraction of the number of time intervals in the plurality of time intervals; and the FFT length associated with the intermittent-interference-plus-noise level estimation is equal to a number of time domain samples of the extended time interval.

10. The method of claim 9, further comprising normalizing to compensate for scaling changes in the thermal noise and intermittent-interference-plus-noise level estimates resulting from use of distinct FFT length.

11. The method of claim 1, further comprising receiving one or more parameters specifying at least one of the number of time intervals in the plurality, a number of time intervals to be discarded prior to estimating the thermal noise, an FFT length to be used in estimating the thermal noise, an FFT length to be used in estimating the interference plus noise level, and a percentile for identifying a reference percentile relative to an order statistic distribution of the spectral magnitude data.

12. The method of claim 1, further comprising issuing an interference alert or invoking an interference suppression or avoidance application if the interference metric exceeds an alert threshold for a predetermined number of sampling cycles.

13. The method of claim 1, wherein the desired RF signal comprises an automotive radar signal and the receiver comprises an automotive radar receiver.

14. An interference detector for use with an RF receiver configured to receive an RF signal including a desired RF signal and potentially an intermittent interference signal occupying an interference bandwidth, comprising:
an interference detection controller and/or processor configured to:
estimate thermal noise of the receiver by statistically analyzing a plurality of time intervals of data of the received RF signal, including at least one time interval not including the intermittent interference signal;
estimate an intermittent-interference-plus-noise level by statistically analyzing an extended time interval of the at least one time intervals of data;
determine an interference metric based on a ratio of the estimated intermittent-interference-plus-noise level to thermal noise; and
evaluate the interference metric against one or more thresholds to detect the presence or absence of degrading RF interference.

15. The detector of claim 14, wherein statistically analyzing comprises application of order statistic filtering.

16. The detector of claim 14, wherein the controller and/or processor is further configured to estimate the thermal noise of the receiver by:
obtaining a frequency domain representation of the plurality of time intervals, the frequency domain representation including a magnitude level for each of a plurality of frequencies sorted in an order statistic distribution,
determining a value associated with a thermal-noise reference percentile relative to the distribution as a raw thermal noise estimate, and
conditioning the raw thermal noise estimate to compensate for estimation bias in order to obtain the thermal noise estimate; and
estimating the intermittent-interference-plus-noise level further comprises
obtaining a frequency domain representation of the extended time interval, the frequency domain representation including a magnitude level for each of a plurality of frequencies sorted in an order statistic distribution,
determining a value associated with the reference percentile relative to the distribution as a raw intermittent-interference-plus-noise level estimate, and
conditioning the raw intermittent-interference-plus-noise level estimate to compensate for estimation bias to obtain the intermittent-interference-plus-noise level estimate.

17. The detector of claim 16, wherein the thermal-noise reference percentile comprises a standard deviation percentile along the distribution selected to be lower than representations of RF object reflections and degrading interference in the distribution.

18. The detector of claim 16, wherein the controller and/or processor is further configured to obtain the frequency domain representations by:
respectively reducing sidelobe energies of the frequency domain representations through application of a window approximation; and
respectively normalizing to compensate for time domain attenuation underestimations of the thermal noise and intermittent-interference-plus-noise level estimates resulting from a window approximation.

19. The detector of claim 16, wherein:
the controller and/or processor is further configured to obtain the frequency domain representations by applying a FFT of respective lengths;
the FFT length associated with the thermal noise estimation is a fraction of the number of time intervals in the plurality of time intervals; and
the FFT length associated with the intermittent-interference-plus-noise level estimation is equal to a number of time domain samples of the extended time interval.

20. The detector of claim 14, wherein the controller and/or processor is further configured to issue an interference alert or invoke an interference suppression or avoidance application if the interference metric exceeds an alert threshold for a predetermined number of sampling cycles.

21. The detector of claim 20, wherein the controller and/or processor is further configured to cease an alert or an invoked interference application if the interference metric falls below an alert off threshold.

22. The detector of claim 14, wherein the RF receiver comprises an automotive radar receiver.

23. An RF receiver configured to detect RF interference, comprising:
a front end configured to receive an RF signal including a desired RF signal and potentially an intermittent interference signal occupying an interference bandwidth; and
an interference detection controller and/or processor configured to:
estimate thermal noise of the receiver by statistically analyzing a plurality of time intervals of data of the received RF signal, including at least one time interval not including the intermittent interference signal;
estimate an intermittent-interference-plus-noise level by statistically analyzing an extended time interval of the time intervals of data;
determine an interference metric based on a ratio of the estimated intermittent-interference-plus-noise level to thermal noise; and
evaluate the interference metric against one or more thresholds to detect the presence or absence of degrading RF interference.

* * * * *